United States Patent
Miyahara et al.

(10) Patent No.: US 8,721,197 B2
(45) Date of Patent: May 13, 2014

(54) IMAGE DEVICE, SURVEILLANCE CAMERA, AND MASK METHOD OF CAMERA SCREEN

(75) Inventors: Hiroyuki Miyahara, Hitachinaka (JP); Makoto Asuka, Mito (JP); Akinori Shiozawa, Yokohama (JP)

(73) Assignee: Hitachi, Ltd., Tokyo (JP)

(*) Notice: Subject to any disclaimer, the term of this patent is extended or adjusted under 35 U.S.C. 154(b) by 78 days.

(21) Appl. No.: 13/571,899

(22) Filed: Aug. 10, 2012

(65) Prior Publication Data

US 2013/0070092 A1 Mar. 21, 2013

(30) Foreign Application Priority Data

Sep. 20, 2011 (JP) ................................. 2011-204727

(51) Int. Cl.
G03B 17/00 (2006.01)
G08B 13/196 (2006.01)

(52) U.S. Cl.
CPC ................................ *G08B 13/19686* (2013.01)
USPC ........................................................ 396/427

(58) Field of Classification Search
CPC ................................................. G08B 13/19686
USPC ........................................................ 396/427
See application file for complete search history.

(56) References Cited

U.S. PATENT DOCUMENTS

| 8,212,872 | B2* | 7/2012 | Sablak | 348/143 |
|---|---|---|---|---|
| 2003/0227555 | A1* | 12/2003 | Kobayashi et al. | 348/231.6 |
| 2006/0158527 | A1* | 7/2006 | Kang et al. | 348/211.99 |
| 2006/0192853 | A1* | 8/2006 | Lee | 348/143 |
| 2009/0015670 | A1* | 1/2009 | Gopinath et al. | 348/143 |
| 2010/0149330 | A1* | 6/2010 | Salgar et al. | 348/143 |
| 2011/0074978 | A1* | 3/2011 | Kogane et al. | 348/240.3 |
| 2011/0085035 | A1* | 4/2011 | Choi et al. | 348/143 |
| 2012/0098965 | A1* | 4/2012 | Barcala | 348/143 |
| 2013/0070092 | A1* | 3/2013 | Miyahara et al. | 348/143 |

FOREIGN PATENT DOCUMENTS

JP 2007-129336 5/2007

* cited by examiner

*Primary Examiner* — W B Perkey
(74) *Attorney, Agent, or Firm* — Antonelli, Terry, Stout & Kraus, LLP.

(57) ABSTRACT

In a microcomputer included in an image device, a mask 2D 3D converting section expresses coordinates of a 2-dimensional image plane defined by an imaging element having a rectangular contour in a 3-dimensional coordinate system. The image plane is positioned in the state that a focal length corresponding to a zoom position is adopted as a Z coordinate value of the image plane in the 3-dimensional coordinate system. A mask display position calculating section 165 calculates a 2-dimensional position of a mask on a camera screen by utilizing a similarity of the size of the image plane and the size of the camera screen when a position of a mask on the image plane in the 3-dimensional coordinate system after PAN, TILT rotations and a zooming is converted into the 2-dimensional position of the mask on the camera screen.

9 Claims, 10 Drawing Sheets

Horizontal Plane Direction

Vertical Plane Direction

| Zoom Position | d_n Value |
|---|---|
| x1 | d_base |
| x2 | d_1 |
| x3 | d_2 |
| x4 | d_3 |
| .. | .. |

Coordinates of p1_moniMASK: (x1_moniMASK, y1_moniMASK)

Coordinates of p2_moniMASK: (x2_moniMASK, y2_moniMASK)

Coordinates of p3_moniMASK: (x3_moniMASK, y3_moniMASK)

Coordinates of p4_moniMASK: (x4_moniMASK, y4_moniMASK)

FIG.10

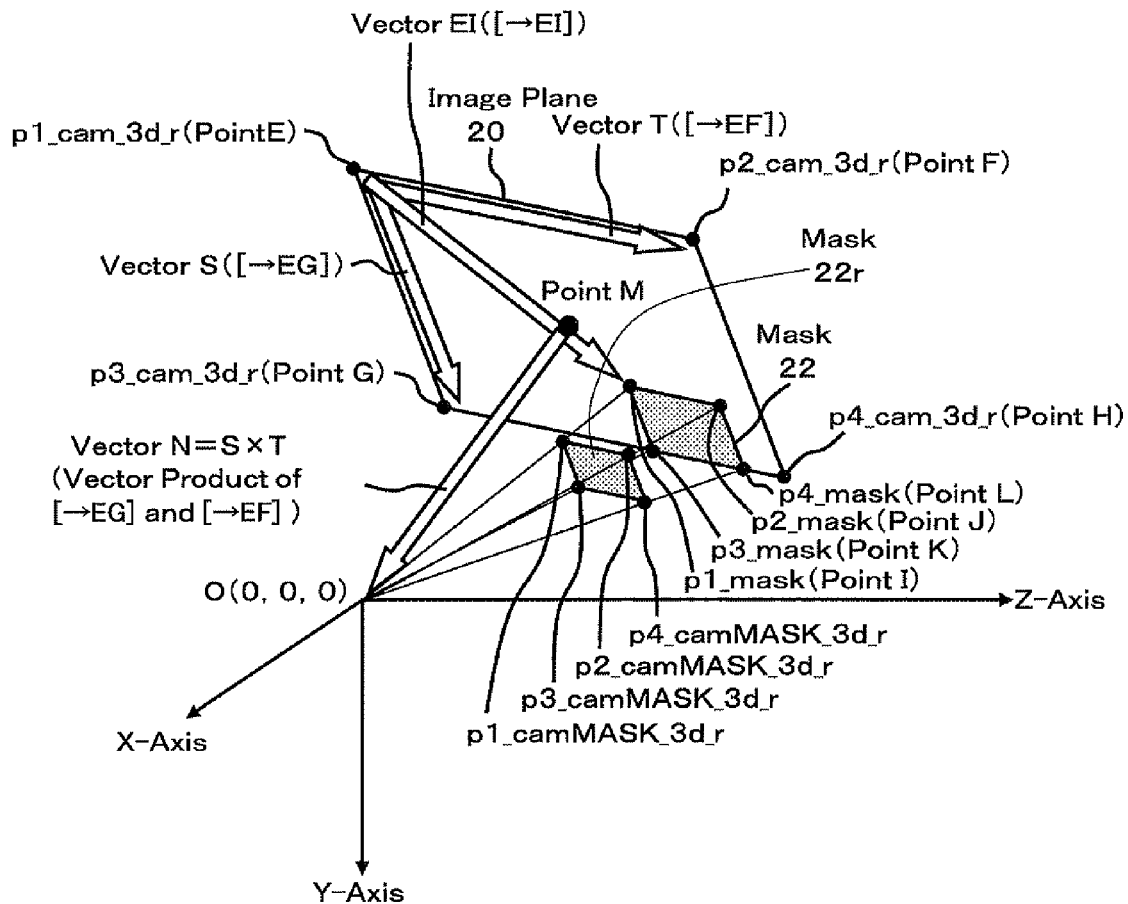

Coordinates of p1_cam_3d_r: (x1_cam_r, y1_cam_r, d1_now_r)
Coordinates of p2_cam_3d_r: (x2_cam_r, y2_cam_r, d2_now_r)
Coordinates of p3_cam_3d_r: (x3_cam_r, y3_cam_r, d3_now_r)
Coordinates of p4_cam_3d_r: (x4_cam_r, y4_cam_r, d4_now_r)

Coordinates of p1_camMASK_3d_r: (x1_camMASK_r, y1_camMASK_r, d1_set_r)
Coordinates of p2_camMASK_3d_r: (x2_camMASK_r, y2_camMASK_r, d2_set_r)
Coordinates of p3_camMASK_3d_r: (x3_camMASK_r, y3_camMASK_r, d3_set_r)
Coordinates of p4_camMASK_3d_r: (x4_camMASK_r, y4_camMASK_r, d4_set_r)

Coordinates of p1_mask: (x1_mask, y1_mask, z1_mask)
Coordinates of p2_mask: (x2_mask, y2_mask, z2_mask)
Coordinates of p3_mask: (x3_mask, y3_mask, z3_mask)
Coordinates of p4_mask: (x4_mask, y4_mask, z4_mask)

IMAGE DEVICE, SURVEILLANCE CAMERA, AND MASK METHOD OF CAMERA SCREEN

CROSS REFERENCE TO RELATED APPLICATIONS

This application claims the foreign priority benefit under Title 35, United State Code, 119 (a)-(d) of Japanese Patent Application No. 2011-204727, filed on Sep. 20, 2011 in the Japan Patent Office, the disclosure of which is herein incorporated by reference in its entirety.

BACKGROUND OF THE INVENTION

1. Technical Field

The present invention relates to a technology for masking a partial area of a picture to be displayed on a camera screen to protect privacy thereof in a surveillance camera system which enables to control a PAN rotation (horizontal swing), a TILT rotation (vertical swing) and a zooming.

A term "corner" means "corner point" in this specification.

2. Description of Background Art

A surveillance camera system which enables to control a PAN rotation, a TILT rotation and a zooming has a structure in which a surveillance camera capable of a zooming thereof is mounted on a rotative table for a camera capable of rotating freely in a PAN rotational direction and a TILT rotational direction. The system is able to select any picture to be displayed by controlling the rotative table and a zoom mechanism of the surveillance camera via a remote operating device. In general, the system has a sequence control function for taking pictures sequentially in each of directions every preset time interval which directions have been settled beforehand, and an alarm function for pointing immediately toward an area in which something unusual has detected by a motion sensor disposed in a territory to be surveilled, and so on. In case that such a system is set in a public space like a street, a masking process is needed for some part of a picture which should not be taken, for example, a private house or an object prohibited from taking a picture in order to protect privacy.

The patent document 1 (JP, 2007-129336,A) discloses the following. Two representative corners are selected from among corners indicating an area to be protected from being displayed on a 2-dimensional camera screen to protect a privacy thereof, and an information of differences between each of the remained corners and the representative corners are calculated in a 2-dimension, and then memorized. Next, the representative corners are disposed in a 3-dimensional rectangular coordinate system to carry out a PAN rotation, a TILT rotation and a zooming. After that, positions of the representative corners in the 3-dimensional rectangular coordinate system are calculated, and these positions are converted back into a 2-dimensional coordinate system on the camera screen. And the positions of the remained corners are calculated by using the previously memorized information of differences, whereby a processing period time can be reduced.

SUMMARY OF THE INVENTION

However, there is a problem that a contour of a partial area of the picture to be protected for privacy thereof cannot be accurately calculated only by the data of the differences in the 2-dimension when the area of the picture to be protected has been rotated or deformed due to a PAN rotation or a TILT rotation, since only two representative corners are handled in the 3-dimensional rectangular coordinate system in the technology of the patent document 1.

Therefore, it is an object of the present invention to provide a technology to accurately calculate a mask area of a picture in order to protect privacy thereof on the camera screen when the mask area is deformed by rotations in PAN and TILT rotational directions and a zooming.

In order to solve the problem mentioned above, there is provided an image device according to the present invention. The image device expresses a 2-dimensional position of an image plane (rectangle) defined by specifications of an imaging element in a 3-dimensional coordinate system by adopting a focal length corresponding to a zoom position on one axis (for example, the Z-axis) of three axes in the 3-dimensional rectangular coordinate system. The image device also expresses a position of a mask area disposed on the image plane in the 3-dimensional coordinate system, then, rotates the mask area in PAN and TILT rotational directions and zooms it together with the image plane in the 3-dimensional coordinate system. Next, the image device converts the position of the mask area on the image plane in the 3-dimensional coordinate system after rotations in PAN and TILT rotational directions or a zooming, into a 2-dimensional position on a camera screen (rectangle) to be watched by a user. In this conversion, a relation that a size of the image plane is similar to a size of the camera screen is utilized. That is, the position of a mask area on the camera screen in the 2-dimensional coordinate system is calculated by using a relation that distances between three corners of the camera screen and each corner of the mask area on the camera screen are proportional to distances between three corners of the image plane and each corner of the mask area on the image plane in the 3-dimensional coordinate system with a constant ratio, respectively.

According to the present invention, a contour of a mask area for privacy protection on a camera screen which is deformed by a PAN rotation, a TILT rotation or a zooming can be accurately calculated.

BRIEF DESCRIPTION OF THE DRAWINGS

FIG. 10 is a view showing how to calculate a position of a mask area projected onto an image plane disposed in the 3-dimensional rectangular coordinate system;

DETAILED DESCRIPTION OF THE PREFERRED EMBODIMENT

An embodiment to carry out the present invention will be explained in detail with reference to the attached drawings.

Figure 1:
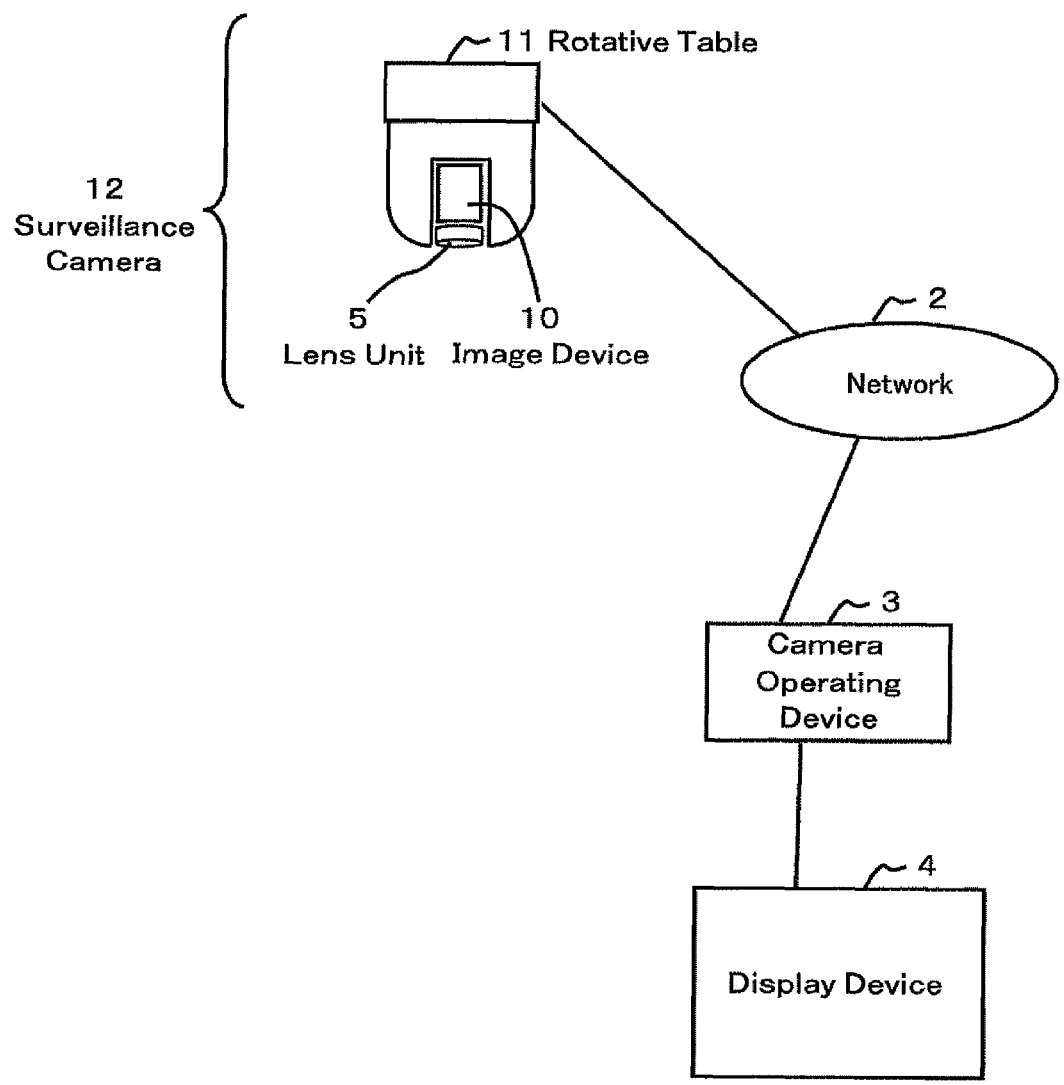
FIG. 1 is a schematic view showing an example of a construction of a surveillance camera system.

First, the whole of a surveillance camera system will be schematically explained with reference to FIG. 1. The surveillance system 1 has a surveillance camera 12, a camera operating device 3 and a display device 4. The surveillance camera 12 and the camera operating device 3 are connected to a network 2 enabling communication between them.

The surveillance camera 12 is constructed by mounting a video camera onto a rotative table 11 which allows to rotate in PAN and TILT rotational directions. The video camera has an optical lens unit 5 to take in a light from the outside, and an image device 10 which allows to change a zoom position of the optical lens unit 5 and convert the captured light into an image signal which can be displayed on a display device 4. The surveillance camera 12 allows operations of PAN and TILT rotations and a zooming, by the camera operating device 3 through the network 2, and take a picture in a direction designated by the camera operating device 3.

The network 2 is constructed by a wired or wireless network using, for example, IP (Internet Protocol). The camera operating device 3 has a sequential function and an alarm function. The function is to memorize a plurality of positions for taking images and to sequentially take a picture of each of the positions, at a constant interval. The alarm function is to point the surveillance camera 12 in a direction toward an area in which something unusual has been detected by a motion sensor (not shown) disposed in a territory to be surveilled. And, the camera operating device 3 also has a function to control the surveillance camera 12 by manual. Furthermore, the camera operating device 3 can control a plurality of surveillance cameras 12 at the same time. Each surveillance camera 12 takes a picture and can outputs an image signal thereof to the display device 4 through the network 2. The display device 4 is a monitoring device to display the image signal thereon.

Figure 2:
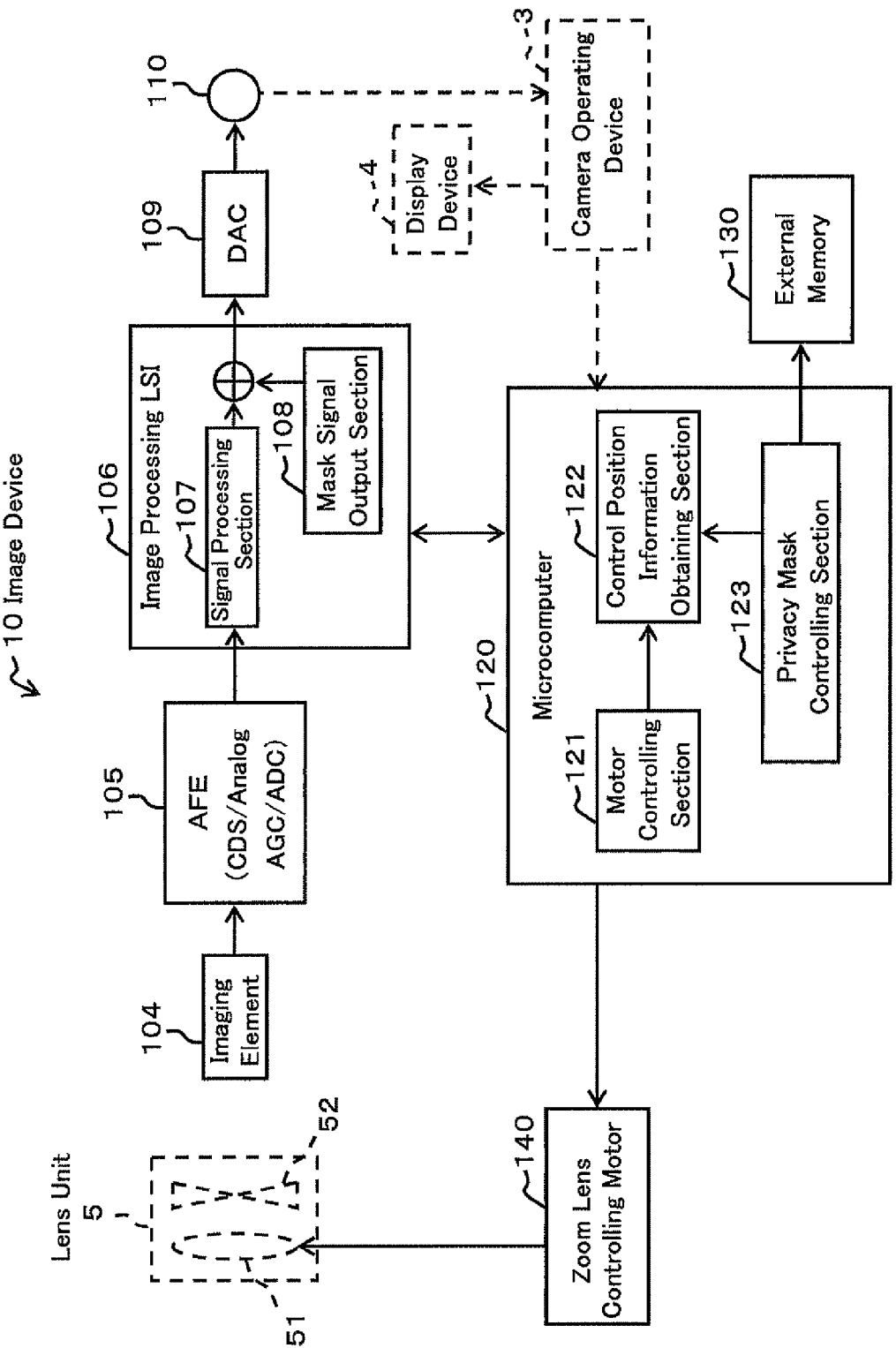
FIG. 2 is a schematic view showing an example of a construction of an image device.

FIG. 2 shows a construction example of the image device 10. The camera operating device 3, the display 4 and the lens unit 5 not included in the image device 10 are shown by the broken line in FIG. 2. First, the construction of the image device 10 will be explained in accordance with a processing flow thereof.

The imaging element 104 includes a CCD (Charge Coupled Device) sensor. A light is taken in from the outside through a lens 51 having a zooming function in the lens unit 5. The quantity of the light is adjusted by an iris diaphragm 52, and the light comes incident onto the CCD sensor through the iris diaphragm 52. The CCD sensor outputs an image signal by the photoelectric conversion.

An AFE (Analog Front End Circuit) 105 carries out a processing of Correlated Double Sampling (hereinafter, CDS), a processing of an analog AGC (Automatic Gain Control) and a processing of an ADC (Analog to Digital Converter) for the input image signal.

An image processing LSI (Large Scale Integration) 106 includes a signal processing section 107 and a mask signal output section 108. The signal processing section 107 carries out each processing of a noise reduction, a sensitivity enhancement, an improvement of a reproduction of color and so on. The mask signal output section 108 outputs a mask signal to be added to a privacy protection area for the output signal from the signal processing section 107. And the image processing LSI 106 adds the mask signal to the output signal from the signal processing section 107. The image processing LSI 106 is connected to a microcomputer 120 in order to carry out a function of the image processing LSI 106 so that a control of the image processing LSI 106 is carried out by the microcomputer 120. Furthermore, the image processing LSI 106 is integrated with various processing functions for the image signal therein, whereby it contributes to a miniaturizing of the image device 10.

A DAC (Digital Analog Converter) 109 converts a digital signal of the output from the image processing LSI 106 into an analog image signal to output the analog image signal through a camera image signal output section 110. And the analog image signal is output to the display device 4 through the camera operating device 3 as shown in FIG. 2. However, the analog image signal may be output directly to the display device 4 without intervention of the camera operating device 3.

The CCD sensor has been explained in FIG. 2 as an example of the imaging element 104. However, the imaging element 104 may be an element like a CMOS (Complementary Metal Oxide Semiconductor) other than the CCD. In this case, a construction of the AFE 105 differs from the case of the CCD. Furthermore, the output signal (the digital image signal) from the image processing LSI 106 may be output to the display device 4 through the camera operating device 3 without using the DAC 109, or may be directly output to the display device 4 without also using the camera operating device 3.

The microcomputer 120 includes a motor controlling section 121, a control position information obtaining section 122 and a privacy mask controlling section 123. The motor controlling section 121 obtains an information of a zoom position from the control position information obtaining section 122 to move a zoom lens controlling motor 140 so that the lens is controlled to be positioned at a setting zoom position. The control position information obtaining section 122 obtains the information of PAN and TILT rotation angles and a zoom position set from the outside of the image device 10. The privacy mask controlling section 123 controls the image processing LSI 106 as the need arises, to carry out an arithmetic operation for a privacy protection area and then set the arithmetic operation result to the mask signal output section 108.

A part of the function of the microcomputer 120 may be provided by a hardware within the image processing LSI 106 instead of software. The details of the microcomputer 120 will be described later.

An external memory 130 is equipped to memorize various data therein. The external memory 130 may be replaced with a memory in the microcomputer 120. However, this embodiment will explain a case that the image device 10 includes the external memory 130 outside the microcomputer 120.

Figure 3:
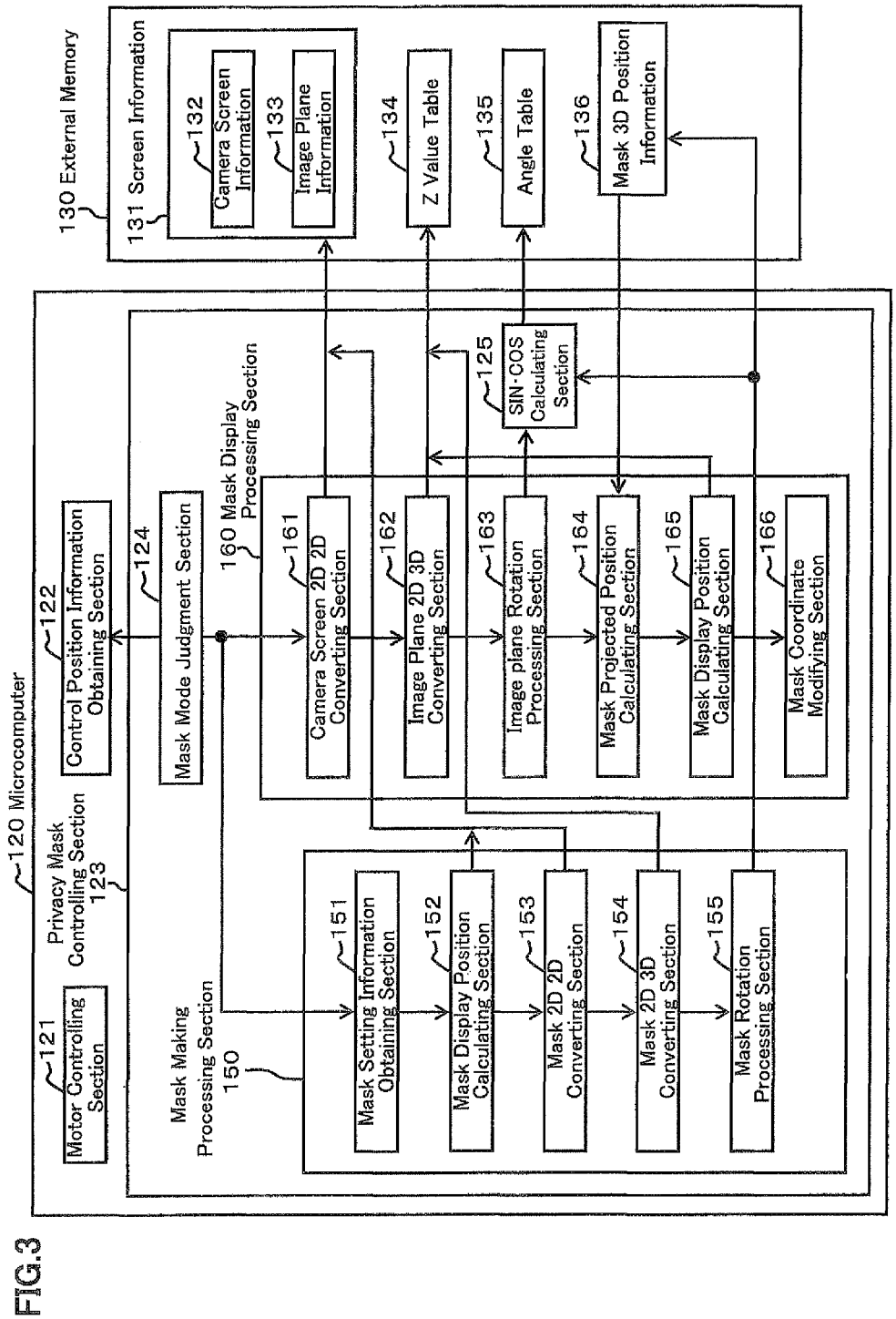
FIG. 3 is a view showing an example of functional sections in a microcomputer and an external memory.

Examples of a function of the microcomputer 120 and of information to be memorized in the external memory 130 will be explained with reference to FIG. 3 and FIG. 2 in case of necessity. First, the information to be memorized in the external memory 130 will be explained. The external memory 130 memorizes a screen information 131, a Z value table 134, an angle table 135 and a mask 3D position information 136.

The screen information 131 includes a camera screen information 132 and an image plane information 133.

Figure 8:
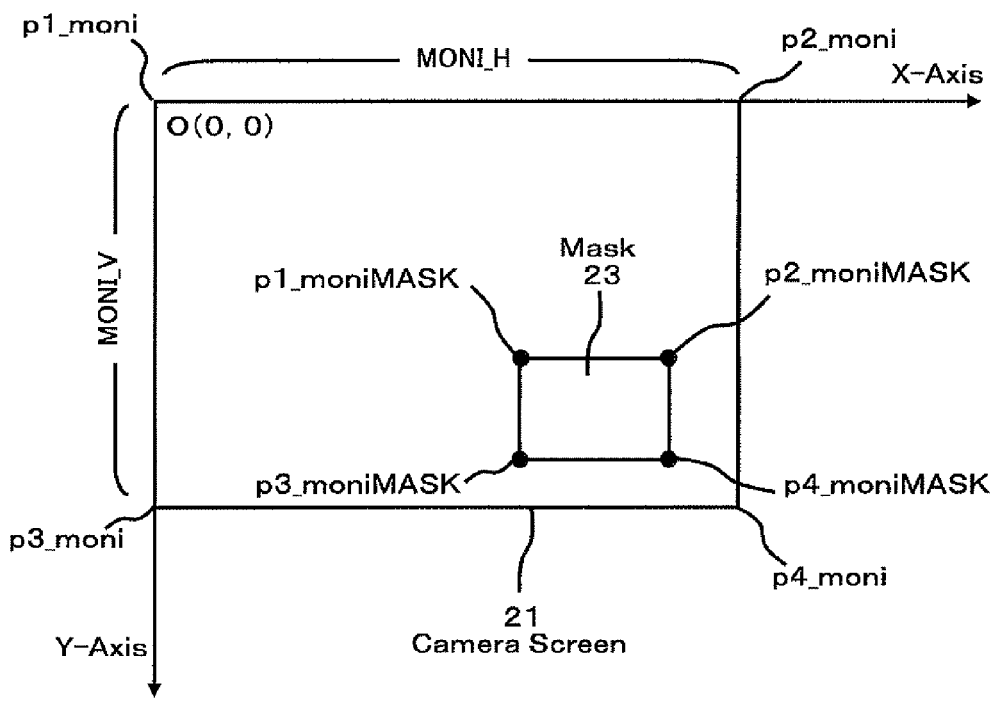
FIG. 8 is a view showing a camera screen disposed in a 2-dimensional rectangular coordinate system.

The camera screen information 132 indicates a width and a height of an image to be finally output to the display device 4 which are respectively memorized as "MONI_H", "MONI_V" (refer to FIG. 8).

Figure 4:
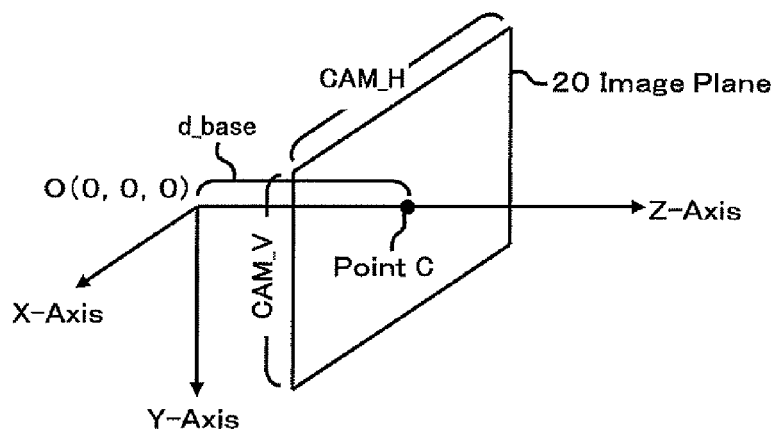
FIG. 4 is a view showing an image plane disposed in a 3-dimensional rectangular coordinate system in case that PAN and TILT rotation angles are equal to zero.

The image plane information 133 includes a size of an image plane 20 (refer to FIG. 4) defined by the imaging element 104 when the image plane 20 is disposed in the 3-dimensional rectangular coordinates system (hereinafter, sometimes, 3-dimensional coordinates system) in the state that the PAN rotation angle is zero and the TILT rotation angle is zero. FIG. 4 shows the state that the image plane 20 is disposed in the 3-dimensional rectangular coordinate system having the X-axis, the Y-axis and the Z-axis. In FIG. 4, the Z-axis is shown as along the direction from an origin O (0, 0, 0) toward the image plane 20, however, the installation of the X, Y and Z axes may be arbitrarily determined.

Figure 5A:
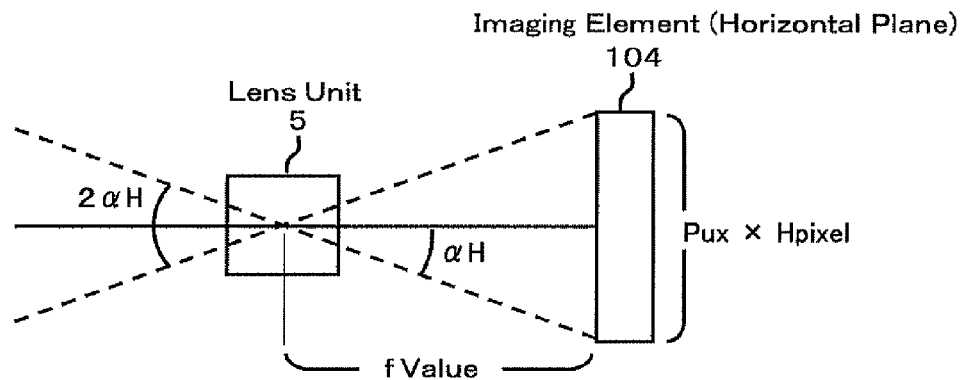
FIG. 5A is a view showing a positional relation of f value (focal length) of lens unit and an imaging element.
Figure 5B:
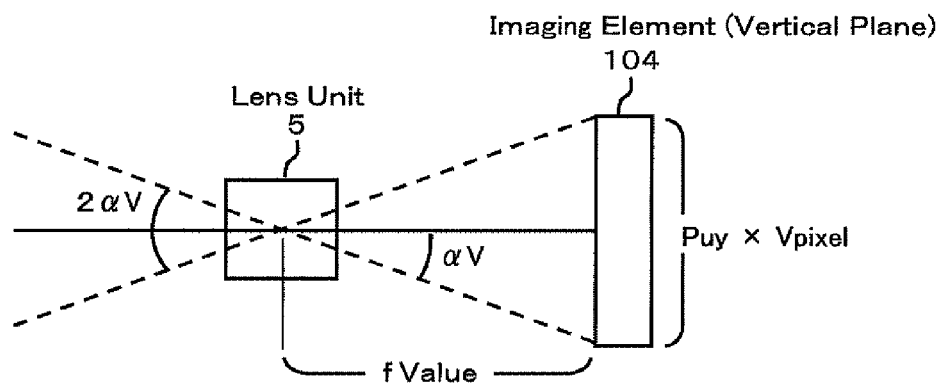
FIG. 5B is another view showing a positional relation of f value of lens unit and an imaging element.

First, "CAM_H" and "CAM_V" are found, the former is a width of, and the latter is a height of the image plane 20 disposed in the 3-dimensional rectangular coordinate system in the above-mentioned state. The relative positions of the lens unit 5 and the imaging element 104 in view along the Y-axis (in a horizontal plane) and in view along the X-axis (in a vertical plane) are shown in FIG. 5A and FIG. 5B, respectively according to the specifications of the lens unit 5. "Pux" and "Puy" the former of which is a width size of a pixel and the latter of which is a vertical size of that, and "Hpixel" and "Vpixel" the former of which is the number of pixels along the width of the imaging element 104 (the horizontal pixel number) and the latter of which is the number of pixels along the height of that (the vertical pixel number) are known beforehand according to the specifications of the imaging element 104. Then, the equations (1) and (2) are obtained when angles in FIG. 5A in view along the Y-axis and in FIG. 5B in view along the X-axis are αH and αV, respectively according to the relation between the lens unit 5 and the imaging element 104. Now, a distance between the lens 51 at a wide end (when an angle of view is set to the widest position) and the imaging element 104 is set as f value. "eq." means "equation" hereinafter.

$$\text{Tan}(\alpha H) = ((Pux \times H\text{pixel})/2)/f\text{value} \qquad \text{eq. (1)}$$

$$\text{Tan}(\alpha V) = ((Puy \times V\text{pixel})/2)/f\text{value} \qquad \text{eq. (2)}$$

The following equations (3) and (4) are obtained according to the position relation in FIG. 4 for making an image when a distance from the origin O (0, 0, 0) to the image plane 20 is set to be equal to "d_base" (standard value) of the distance at the wide end.

$$\text{Tan}(\alpha H) = (CAM\_H/2)/d\_\text{base} \qquad \text{eq. (3)}$$

$$\text{Tan}(\alpha V) = (CAM\_V/2)/d\_\text{base} \qquad \text{eq. (4)}$$

Therefore, the following equations (5) and (6) are derived by using the equations (1), (2), (3) and (4).

$$CAM\_H = (d\_\text{base} \times Pux \times H\text{pixel})/f\text{value} \qquad \text{eq. (5)}$$

$$CAM\_V = (d\_\text{base} \times Puy \times V\text{pixel})/f\text{value} \qquad \text{eq. (6)}$$

Since "CAM_H" and "CAM_V" can be calculated according to the value of "d_base" in the 3-dimensional coordinate system, they are calculated beforehand and stored as the image plane information 133.

The screen information 131 can be calculated by using the microcomputer 120, on the other hand, it can be memorized beforehand so that the processing period time can be shortened, since the screen information 131 can be determined as the fixed one when the specifications of the image signal and the imaging element 104 are settled.

Next, the Z value table 134 will be explained in the following with reference to FIGS. 2 and 3. The Z value table 134 memorizes the relation between "d_base" shown in FIG. 4 and f value designating the distance between the lens 51 and the imaging element 104. This is for making a change of the value of "d_base" in the 3-dimensional coordinate system shown in FIG. 4 since the f value of the distance between the lens 51 and the imaging element 104 changes in accordance with setting of the zoom position (arbitrary position between the wide end and telescopic end) of the surveillance camera 12. So the Z value table 134 beforehand memorizes values of "d_n" at various zoom positions. The following equations (7) and (8) are obtained by generalization of the equations (5) and (6). The value of "d_n" is calculated by substituting f value designating the focal length at some zoom position into the equations (7) or (8).

$$d\_n = (CAM\_H \times f\text{value})/(Pux \times H\text{pixel}) \qquad \text{eq. (7)}$$

$$d\_n = (CAM\_V \times f\text{value})/(Puy \times V\text{pixel}) \qquad \text{eq. (8)}$$

Figures 6, 7:
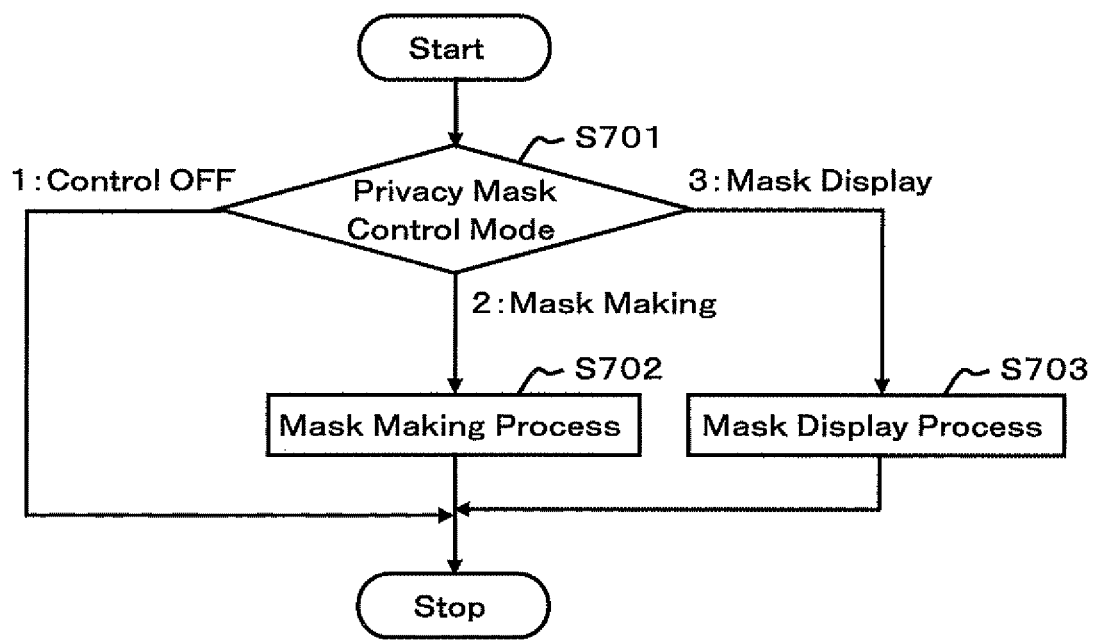
FIG. 6 is a view showing an example table for Z values.
FIG. 7 is a view showing an example of a flow chart in a mask mode judgment section.

The value of "d_n" can be calculated by using either of the equations (7) and (8). The Z value table 134 is made, for example, by connecting the zoom position with the value of "d_n" as shown in FIG. 6. The Z value table 134 can also be calculated by using the microcomputer 120. However, it is preferable to previously memorize them as a table data since the above-mentioned calculation is that with a large processing load thereof, and the Z value table can be uniquely defined when specifications of the lens unit 5 are determined.

The angle table 135 includes sine values corresponding to angles from 0 to 90 angle degrees. Calculations for a sine or a cosine can be carried out by using the microcomputer 120. However, shortening of the calculation period time can be achieved by previously memorizing as a table data since the calculation involves a large processing load. Values of sine and cosine corresponding to angles from 0 to 360 angle degrees may be memorized, however, a memory capacity of the external memory 130 is limited and it is needed to suppress an increase of an amount of memory data. Therefore, only the values of sine corresponding to angles from 0 to 90 angle degrees are memorized in the angle table 135. Then, values of sine and cosine corresponding to angles from 0 to 360 angle degrees are found or calculated with a low processing load by using the values of sine corresponding to angles from 0 to 90 angle degrees as follows. The processing is carried out by a SIN·COS calculating section 125 of a privacy mask controlling section 123 in the microcomputer 120.

Now, the processing by the privacy mask controlling section 123 will be explained. Values of SIN zero angle degree to SIN 360 angle degree and COS zero angle degree to COS 360 angle degree are found or calculated with a low processing load referring to the values of SIN zero angle degree to SIN 90 angle degree on demand which values of SIN are previously memorized in the angle table 135. In the concrete, the values can be found or calculated by either of the following equations (9a) to (9d) and (10a) to (10d) which are selected in accordance with an arbitrary value of angle α.

A unit of angle, that is, "angle degree" is omitted in the following equations.

$$\text{SIN } \alpha = \text{SIN } \alpha \, (0 \leq \alpha < 90) \qquad \text{eq. (9a)}$$

$$\text{SIN } \alpha = -\text{SIN}(90-\alpha) \, (90 \leq \alpha < 180) \qquad \text{eq. (9b)}$$

$$\text{SIN } \alpha = -\text{SIN}(\alpha-180) \, (180 \leq \alpha < 270) \qquad \text{eq. (9c)}$$

$$\text{SIN } \alpha = -\text{SIN}(90-(\alpha-270)) \, (270 \leq \alpha < 360) \qquad \text{eq. (9d)}$$

$$\cos \alpha = \sin(90-\alpha)(0 \leq \alpha < 90) \qquad \text{eq. (10a)}$$

$$\cos \alpha = -\sin(\alpha-90)(90 \leq \alpha < 180) \qquad \text{eq. (10b)}$$

$$\cos \alpha = -\sin(90-(\alpha-180))(180 \leq \alpha < 270) \qquad \text{eq. (10c)}$$

$$\cos \alpha = \sin(\alpha-270)(270 \leq \alpha < 360) \qquad \text{eq. (10d)}$$

Next, functions of the privacy mask controlling section 123 in the microcomputer 120 will be explained. The privacy mask controlling section 123 includes a mask mode judgment section 124, a mask making processing section 150 and a mask display processing section 160.

The mask mode judgment section 124 judges a mode to control masking for privacy. In the concrete, the mask mode judgment section 124 selects one among 1: control off, 2: mask making and 3: mask display as a mode to control masking for privacy at a step S701 as shown in FIG. 7. No processing is done in case of 1: control off. The mask making process section 150 carries out processing of making a mask at a step S702 in case of 2: mask making. The mask display processing section 160 carries out processing of displaying a mask at a step S703 in case of 3: mask display.

The processing of making a mask at the step S702 is a mode of making a mask to cover a privacy protection area with use of the surveillance camera 12. The processing of displaying a mask at the step S703 is a mode of enabling to display the mask on a camera screen 21 (refer to FIG. 8) to be displayed on the display device 4 so that a mask made by the processing of making a mask can certainly cover a privacy protection area when the surveillance camera 12 has done PAN and/or TILT rotations and/or a zooming. In the concrete, the mask signal output section 108 in the image processing LSI 106 carries out a setting for mask display in accordance with the process results of the mask making processing section 150 and the mask display processing section 160.

Next, the function of the mask making processing section 150 will be explained with reference to FIG. 3, and sometimes to FIG. 1, 2 or 8. The mask making processing section 150 includes a mask setting information obtaining section 151, a mask display position calculating section 152, a mask 2D 2D converting section 153, a mask 2D 3D converting section 154 and a mask rotation processing section 155.

The mask setting information obtaining section 151 obtains information of a position (moniMASK_Hposi, moniMASK_Vposi) and a size (moniMASK_Hsize, moniMASK_Vsize) of a mask 23 set on the camera screen 21 shown in FIG. 8 via communication from the camera operating device 3 to the surveillance camera 12. The mask 23 is set as a rectangle. In this embodiment, for example, moniMASK_Hposi and moniMASK_Vposi are set as the data of −128 to 127, and moniMASK_Hsize and moniMASK_Vsize are set as the data of 0 to 128. However, a mask contour may be one like a trapezoid or a circle other than a rectangle.

The mask display position calculating section 152 calculates corner coordinates
p1_moniMASK(x1_moniMASK,y1_moniMASK),
p2_moniMASK(x2_moniMASK,y2_moniMASK),
p3_moniMASK(x3_moniMASK,y3_moniMASK), and
p4_moniMASK(x4_moniMASK,y4_moniMASK)
of the mask 23 on the camera screen 21 in accordance with moniMASK_Hposi, moniMASK_Vposi, moniMASK_Hsize and moniMASK_Vsize. The corner coordinates are calculated by using the following equations (11), (12), (13) and (14) together with MONI_H and MONI_V derived from the camera screen information 132 of the screen information 131 in the external memory 130. In this case, the coordinate system of the camera screen 21 is set as designated in FIG. 8. However, the direction of the coordinate axes in FIG. 8 is an example and may be arbitrarily set.

$$x1\_moniMASK = \qquad \text{eq. (11)}$$
$$x3\_moniMASK = (MONI\_H/2) + (MONI\_H/256) \times$$
$$(-moniMASK\_Hsize + moniMASK\_Hposi)$$

$$x2\_moniMASK = \qquad \text{eq. (12)}$$
$$x4\_moniMASK = (MONI\_H/2) + (MONI\_H/256) \times$$
$$(moniMASK\_Hsize + moniMASK\_Hposi)$$

$$y1\_moniMASK = \qquad \text{eq. (13)}$$
$$y2\_moniMASK = (MONI\_V/2) - (MONI\_V/256) \times$$
$$(moniMASK\_Vsize + moniMASK\_Vposi)$$

$$y3\_moniMASK = \qquad \text{eq. (14)}$$
$$y4\_moniMASK = (MONI\_V/2) - (MONI\_V/256) \times$$
$$(-moniMASK\_Vsize + moniMASK\_Vposi)$$

The mask 2D 2D converting section 153 converts the corner coordinates (p1_moniMASK, p2_moniMASK, p3_moniMASK, p4_moniMASK) of the mask 23 on the camera screen 21 calculated by the mask display position calculating section 152 into the corner coordinates
(p1_camMASK(x1_camMASK, y1_camMASK)
p2_camMASK(x2_camMASK,y2_camMASK),
p3_camMASK(x3_camMASK,y3_camMASK),
p4_camMASK(x4_camMASK, y4_camMASK))
of a mask on the image plane 20. The conversion is done by using the following equations (15) and (16) together with CAM_H and CAM_V derived from the image plane information 133 of the screen information 131 in the external memory 130. The coordinate system about the image plane 20 has the origin (0, 0) designating the center of the image plane 20, and the positive directions of the X-axis and the Y-axis are the right direction and the downward direction, respectively.

$$x^*\_camMASK = x^*\_moniMASK \times CAM\_H / MONI\_H - CAM\_H/2 \qquad \text{eq. (15)}$$

$$y^*\_camMASK = y^*\_moniMASK \times CAM\_V / MONI\_V - CAM\_V/2 \qquad \text{eq. (16)}$$

Here and hereinafter, an asterisk * designates a corner number 1, 2, 3, or 4.

The mask 2D 3D converting section 154 also obtains the value of d_set which is to be set as the coordinate value on the Z-axis corresponding to a present zoom position (f value) from the Z value table 134 in the external memory 130, in addition to the corner coordinates (p1_camMASK, p2_camMASK, p3_camMASK, p4_camMASK) of a mask on the image plane 20 converted by the mask 2D 2D converting section 153. The image plane 20a is positioned so that a Z coordinate value thereof is the value of d_set mentioned above as shown by dotted lines in FIG. 9. The center point Ca of the image plane 20a is positioned on the Z-axis. Consequently, corner coordinates of a mask 22a on the image plane 20a in a 2-dimensional coordinate system are expressed in a 3-dimensional coordinate system. The corner coordinates of the mask disposed in the 3-dimensional coordinate system is as follows.
p1_camMASK_3d(x1_camMASK,y1_camMASK,d1_set),
p2_camMASK_3d(x2_camMASK,y2_camMASK,d2_set),
p3_camMASK_3d(x3_camMASK,y3_camMASK,d3_set), and
p4_camMASK_3d(x4_camMASK,y4_camMASK,d4_set)

Where, d_set=d1_set=d2_set=d3_set=d4_set

The above coordinates are the first information in the present invention.

The above mask 22a in the 3-dimensional coordinate system is disposed on the image plane 20a in the 3-dimensional coordinate system when the PAN and TILT rotation angles are zero. However, in fact, the surveillance camera 12 is positioned in the state that PAN and TILT rotation angles are each appropriate angle due to an operation of the camera operating device 3. Therefore, a mask 22r after rotations of PAN and/or TILT must be positioned on the image plane 20 after the rotations of PAN and/or TILT. Corner coordinates of the image plane 20 after rotations of PAN and/or TILT are as follows. The center point Ca of the image plane 20a moves to a center point C after the rotations.

p1_cam__3d_r(x1_cam_r,y1_cam_r,d1_set_r),
p2_cam__3d_r(x2_cam_r,y2_cam_r,d2_set_r),
p3_cam__3d_r(x3_cam_r,y3_cam_r,d3_set_r), and
p4_cam__3d_r(x4_cam_r,y4_cam_r,d4_set_r)

Then, the mask rotation processing section 155 calculates corner coordinates of the mask 22r by also rotating the mask 22a for the corner coordinates (p1_camMASK__3d, p2_camMASK__3d, p3_camMASK__3d, p4_camMASK__3d) of the mask 22a by as much degrees as the image plane 20a in the 3-dimensional coordinate system being rotated in PAN and/or TILT rotational directions to be the image plane 20.

p1_camMASK__3d_r(x1_camMASK_r,y1_camMASK_r,d1_set_r),
p2_camMASK__3d_r(x2_camMASK_r,y2_camMASK_r,d2_set_r),
p3_camMASK__3d_r(x3_camMASK_r,y3_camMASK_r,d3_set_r), and
p4_camMASK__3d_r(x4_camMASK_r,y4_camMASK_r,d4_set_r)

The above coordinates are the second information in the present invention.

Figure 9:
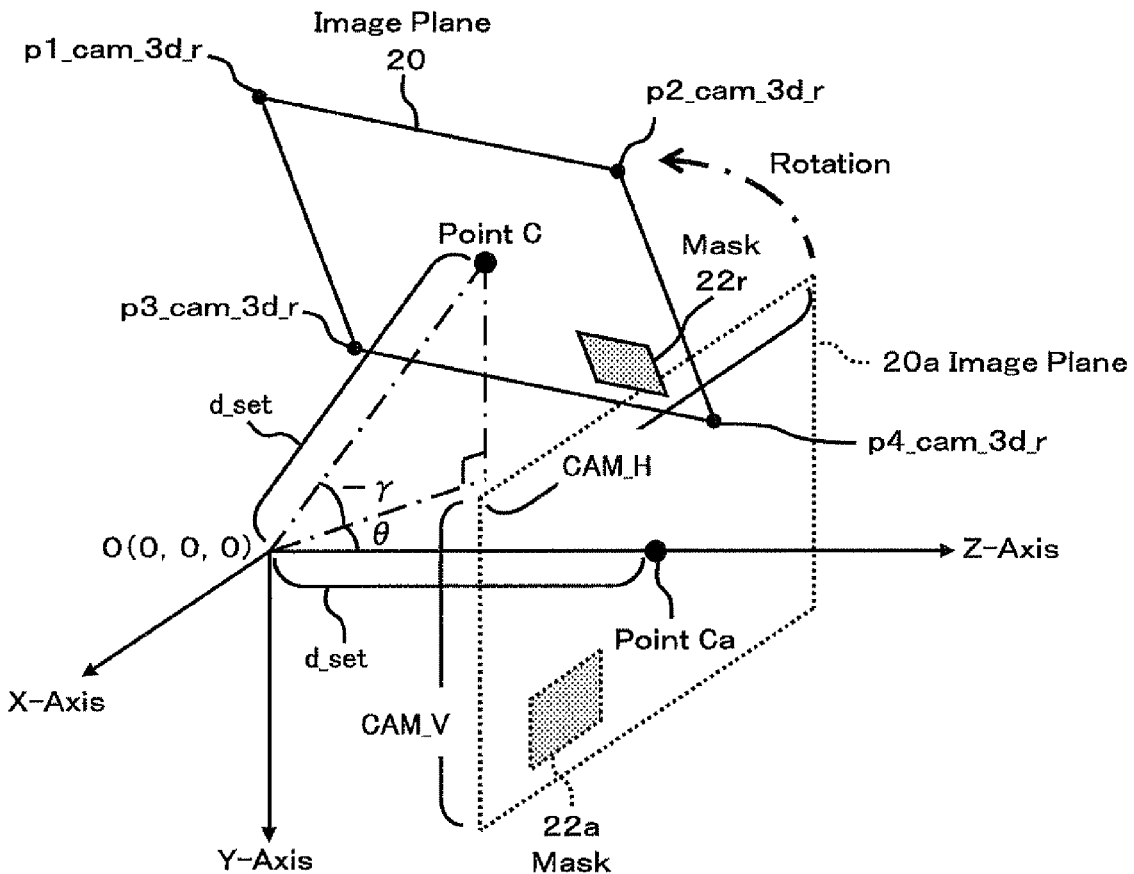
FIG. 9 is a view showing an image plane disposed in a 3-dimensional rectangular coordinate system after PAN and TILT rotations of an image device.

Specifically, when the surveillance camera 12 is rotated in PAN and TILT rotational directions as shown in FIG. 9, the PAN rotation angle is set to θ degrees and the TILT rotation angle is set to γ degrees. The above operation is carried out by processing that the mask rotation processing section 155 calculates the corner coordinates of the mask when the counter-clockwise rotation around the Y-axis is done by θ degrees, and the clockwise rotation around the X-axis is done by γ degrees, each axis passing through the origin O (0, 0, 0) in the 3-dimensional coordinate system. That is, the corner coordinates of the mask can be calculated by using simple rotation matrixes for rotations about the X-axis and the Y-axis. However, central axes of rotations are determined according to the way how the X, Y and Z-axes are selected, so the rotation matrixes of the corresponding axes are used. The operation for rotations in this embodiment is done by using the following equation (17). Values of SIN or COS corresponding to the angle range of 0 to 360 degrees are calculated with reference to the angle table 135 in the external memory 130 through the SIN. COS calculating section 125 of the privacy mask controlling section 123 in the microcomputer 120. Thereby, the processing load is lower than a case of calculating SIN or COS directly in the microcomputer 120. Furthermore, after a focal length corresponding to a zoom position is set to a coordinate value on one axis, for example, the Z-axis of the three axes to calculate the position of the mask 22a in the 3-dimensional coordinate system as shown in FIG. 9, letting the mask 22a rotate can reduce a processing load and get a better operation precision.

$$\begin{pmatrix} x*\_camMASK\_r \\ y*\_camMASK\_r \\ d*\_set\_r \end{pmatrix} = \begin{pmatrix} COS\theta & 0 & SIN\theta \\ 0 & 1 & 0 \\ -SIN\theta & 0 & COS\theta \end{pmatrix} \begin{pmatrix} 1 & 0 & 0 \\ 0 & COS\gamma & -SIN\gamma \\ 0 & SIN\gamma & COS\gamma \end{pmatrix} \begin{pmatrix} x*\_camMASK \\ y*\_camMASK \\ d*\_set \end{pmatrix} \quad \text{eq. (17)}$$

The mask rotation processing section 155 stores the corner coordinates (p1_camMASK__3d_r, p2_camMASK__3d_r, p3_camMASK__3d_r, p4_camMASK__3d_r) of the mask 22r after rotations to the mask 3D position information 136 in the external memory 130. That is, the position of the mask 22r after rotations in the 3-dimensional coordinate system is fixed or determined in the 3-dimensional coordinate system after finishing a process of mask-making.

Furthermore, it is preferable to enable a visual confirmation easily in the display device 4 by setting the corner coordinates (p1_moniMASK, p2_moniMASK, p3_moniMASK, p4_moniMASK) of the mask 23 calculated by the mask display position calculating section 152 in the mask signal output section 108 in the image processing LSI 106 when a position of the mask 23 is set on the camera screen 21 (refer to FIG. 8) by way of the camera operating device 3 during the processing of the mask-making.

Now, the function of the mask display processing section 160 will be explained with reference to FIG. 3. The mask display processing section 160 includes a camera screen 2D 2D converting section 161, an image plane 2D 3D converting section 162, an image plane rotation processing section 163, a mask projected position calculating section 164, a mask display position calculating section 165 and a mask coordinate modifying section 166.

The camera screen 2D 2D converting section 161 carries out processing of conversion of 2-dimensional coordinates of the camera screen 21 into 2-dimensional coordinates of the image plane 20. In the concrete, the camera screen 2D 2D converting section 161 reads out MONI_H, MONI_V, CAM_H and CAM_V from the camera screen information 132 and the image plane information 133 of the screen information 131 in the external memory 130, respectively. Corner coordinates p1_moni(x1_moni,y1_moni), p2_moni(x2_moni,y2_moni), p3_moni(x3_moni,y3_moni) and p4_moni(x4_moni,y4_moni) of the camera screen 21 are expressed by p1_moni(0,0), p2_moni(MONI_H,0), p3_moni(0,MONI_V) and p4_moni(MONI_H,MONI_V) as shown in FIG. 8 when the upper left corner of the camera screen 21 is the origin O (0, 0) in the section 161. The corner coordinates of the camera screen 21 are converted into corner coordinates p1_cam(x1_cam,y1_cam), p2_cam(x2_cam,y2_cam), p3_cam(x3_cam,y3_cam) and p4_cam(x4_cam,y4_cam) of the image plane 20 by using equations like the equations (15) and (16). However, the aforesaid corner coordinates (p1_moni, p2_moni, p3_moni, p4_moni) and (p1_cam, p2_cam, p3_cam, p4_cam) may be calculated beforehand by using MONI_H, MONI_V, CAM_H and CAM_V to be previously stored to the external memory 130.

The image plane 2D 3D converting section 162 positions the corner coordinates (p1_cam, p2_cam, p3_cam, p4_cam) of the image plane 20 in the 2-dimensional coordinate system calculated by the camera screen 2D 2D converting section 161 into the 3-dimensional coordinate system. The section 162 reads out d_now corresponding to the present zoom position from the Z value table 134 in the external memory 130 to set the value of d_now as the Z coordinate of each corner of the image plane 20 instead of d_set shown in FIG. 9. Therefore, the corner coordinates of the image plane 20 in the 3-dimensional coordinate system are as follows.
p1_cam_3d(x1_cam,y1_cam,d1_now),
p2_cam_3d(x2_cam,y2_cam,d2_now),
p3_cam_3d(x3_cam,y3_cam,d3_now) and
p4_cam_3d(x4_cam,y4_cam,d4_now)

Where, d_now=d1_now=d2_now=d3_now=d4_now

The image plane rotation processing section 163 calculates corner coordinates p1_cam_3d_r (x1_cam_r,y1_cam_r, d1_now_r), p2_cam_3d_r(x2_cam_r,y2_cam_r,d2_now_r), p3_cam_3d_r(x3_cam_r,y3_cam_r,d3_now_r), and p4_cam_3d_r(x4_cam_r,y4_cam_r,d4_now_r) of the image plane 20 in the 3-dimensional coordinate system when the corner coordinates p1_cam_3d, p2_cam_3d, p3_cam_3d and p4_cam_3d calculated by the image plane 2D 3D converting section 162 are rotated by PAN rotation angle θ and TILT rotation angle γ (refer to FIG. 10). In the concrete, the section 163 carries out an operation for rotations shown by the equation (17) for each corner coordinates of the image plane 20. Thus the image plane 20 is firstly positioned so that the image plane 20 is at right angle to one axis (the Z-axis in this embodiment) of three axes in the 3-dimensional coordinate system in case that PAN rotation angle is zero and TILT rotation angle is zero, and then rotated, whereby the processing load can be reduced.

The mask projected position calculating section 164 projects the mask 22r onto the image plane 20 to calculate corner coordinates of a mask 22 projected, by using the coordinates of the image plane 20 in 3-dimensional coordinate system rotated in the processing of the section 163 and the coordinates of the mask memorized in the mask 3D position information 136 in the external memory 130, as shown in FIG. 10. In the concrete, each corner coordinates of the mask 22 are expressed as p1_mask(x1_mask,y1_mask,z1_mask), p2_mask(x2_mask, y2_mask,z2_mask), p3_mask(x3_mask, y3_mask,z3_mask) or p4_mask(x4_mask,y4_mask, z4_mask), when the corner coordinates p1_camMASK_3d_r, p2_camMASK_3d_r, p3_camMASK_3d_r and p4_camMASK_3d_r of the mask 22r in the 3-dimensional coordinate system are projected onto the image plane 20.

The mask generating section in this embodiment includes the aforesaid sections 154, 155 and 164, and preferably includes the aforesaid mask making processing section 150 and the aforesaid sections 161, 162, 163 and 164 of the mask display processing section 160.

Next, how to find each corner coordinates p1_mask, p2_mask, p3_mask and p4_mask of the mask 22 will be explained with reference to FIG. 10. Hereinafter, a vector with the start point A and the terminal point B is shown as a vector AB or AB. A vector MO in case of a center point M of the image plane 20 and the origin O in the 3-dimensional coordinate system is perpendicular to the image plane 20 so that it is also a normal vector N normal to the image plane 20. The normal vector N of the image plane 20 is expressed by a vector product S×T of a vector S (→EG) from a point E (p1_cam_3d_r) to a point G (p3_cam_3d_r) and a vector T (→EF) from the point E to a point F (p2_cam_3d_r) using three corners' coordinates on the image plane 20. The vector product S×T is calculated by using the following equations (18), (19) and (20).

$$\text{Vector } S=(x3\_cam\_r-x1\_cam\_r, y3\_cam\_r-y1\_cam\_r, d3\_now\_r-d1\_now\_r) \quad \text{eq. (18)}$$

$$\text{Vector } T=(x2\_cam\_r-x1\_cam\_r, y2\_cam\_r-y1\_cam\_r, d2\_now\_r-d1\_now\_r) \quad \text{eq. (19)}$$

$$\text{Vector } N=\text{vector product } S\times T=(a,b,c) \quad \text{eq. (20)}$$

Where, $a=(y3\_cam\_r-y1\_cam\_r)\times(d2\_now\_r-d1\_now\_r)-(d3\_now\_r-d1\_now\_r)\times(y2\_cam\_r-y1\_cam\_r)$, $b=(d3\_now\_r-d1\_now\_r)\times(x2\_cam\_r-x1\_cam\_r)-(x3\_cam\_r-x1\_cam\_r)\times(d2\_now\_r-d1\_now\_r)$ and $c=(x3\_cam\_r-x1\_cam\_r)\times(y2\_cam\_r-y1\_cam\_r)-(y3\_cam\_r-y1\_cam\_r)\times(x2\_cam\_r-x1\_cam\_r)$ Each of corners with corner coordinates (p1_mask, p2_mask, p3_mask, p4_mask) of the mask 22 projected onto the image plane 20 is positioned on each line which passes through the origin O in the 3-dimensional coordinate system and each corner of the mask 22r. So corner coordinates (p1_mask, p2_mask, p3_mask, p4_mask) of the mask 22 are expressed by the following equation (21) with coefficient k1, k2, k3 or k4.

$$p^*\_mask(x^*\_mask, y^*\_mask, z^*\_mask) = k^* \times p^*\_camMASK\_3d\_r(x^*\_camMASK\_r, y^*\_camMASK\_r, d^*\_set\_r) \quad \text{eq. (21)}$$

Namely, the corner coordinates of the mask 22 projected onto the image plane 20 in the 3-dimensional coordinate system can be calculated when the coefficient k1, k2, k3 or k4 corresponding to each corner is found.

Vectors EI, EJ, EK and EL are expressed as the following equation (22) which are a vector from the point E to a point I (p1_mask), a vector (not shown) from the point E to a point J (p2_mask), a vector (not shown) from the point E to a point K (p3_mask) and a vector (not shown) from the point E to a point L (p4_mask), respectively, by using the equation (21).

$$(x^*\_mask-x^*\_cam\_r, y^*\_mask-y^*\_cam\_r, z^*\_mask-d^*\_now\_r)=(k^*\times x^*\_camMASK\_r-x^*\_cam\_r, k^*\times y^*\_camMASK\_r-y^*\_cam\_r, k^*\times d^*\_set\_r-z^*\_cam\_r) \quad \text{eq. (22)}$$

Each of the vectors EI, EJ, EK and EL is orthogonal to the vector product S×T calculated by the equation (20) so that an inner product of these two vectors is zero. That is, the following equations (23) are obtained.

vector EI·vector product S×T=0, vector EJ·vector product S×T=0, vector EK·vector product S×T=0, and $$\text{vector } EL \cdot \text{vector product } S \times T = 0 \quad \text{eq. (23)}$$

The equations (23) are solved for the coefficients k1, k2, k3 and k4 so that the following equation (24) is obtained. Each corner coordinates (p1_mask, p2_mask, p3_mask, p4_mask) of the mask 22 projected onto the image plane 20 can be calculated by using the coefficients k1, k2, k3 and k4 calculated.

$$k^*=(a\times x1\_cam\_r+b\times y1\_cam\_r+c\times z1cam\_r)/(a\times x^*\_camMASK\_r+b\times y^*\_camMASK\_r+c\times d^*\_set\_r) \quad \text{eq. (24)}$$

Further, in case that the coefficients k1, k2, k3 and k4 calculated are negative values, the mask 22r cannot be projected onto the image plane 20 since the projection thereof is opposite to the image plane 20. That is, there is no projection of the mask 22r onto the image plane 20 in that case. The denominator of the equation (24) is an inner product of vector product S×T and each vector from the origin O to each corner of the mask 22r to be projected onto the image plane 20. So in case that the denominator is zero, the image plane 20 and the mask 22r are in perpendicular relations so that the mask 22r cannot be projected onto the image plane 20. That is, there is no projection of the mask 22r onto the image plane 20 also in case that the denominator is zero.

The mask display position calculating section 165 calculates each corner coordinates of a mask 23a (second mask area) to be displayed on the camera screen 21 by using the each corner coordinates (p1_mask, p2_mask, p3_mask, p4_mask) of the mask 22 (first mask area) projected onto the image plane 20 and calculated by the mask projected position calculating section 164 (refer to FIG. 11). A method for converting the 3-dimensional coordinate system into the 2-dimensional coordinate system is, in general, to rotate the present image plane 20 for PAN rotation angle ($-\theta$) and TILT rotation angle ($-\gamma$) and then return it back to the position in which PAN rotation angle is zero and TILT rotation angle is zero because the image plane 20 at the present time is positioned at the rotational position of PAN rotation angle $\theta$ and TILT rotation angle $\gamma$. Converting with multiplying the values of the X and Y coordinates by the coefficients is possible by setting each corner coordinate of Z the same. However, a position calculated with the operation for rotations in an actual control tends to shift a bit from a theoretical position in relation to operation precision of the microcomputer 120. Therefore, the calculation error between the theoretical coordinate values and the coordinate values in the actual control calculated with further operation for the reverse rotations after the operation for rotations is enlarged so that the shift amount between the theoretical position and the actual position of the mask displayed is enlarged.

Therefore, a method for converting the corner coordinates of the mask 22 in the 3-dimensional coordinate system directly into the 2-dimensional coordinate system without the operation for the reverse rotations will be explained in this embodiment. The mask display position calculating section 165 directly converts the corner coordinates of the mask 22 projected onto the image plane 20 in the 3-dimensional coordinate system into the corner coordinates of the mask 23a on the camera screen 21.

Figure 11A:
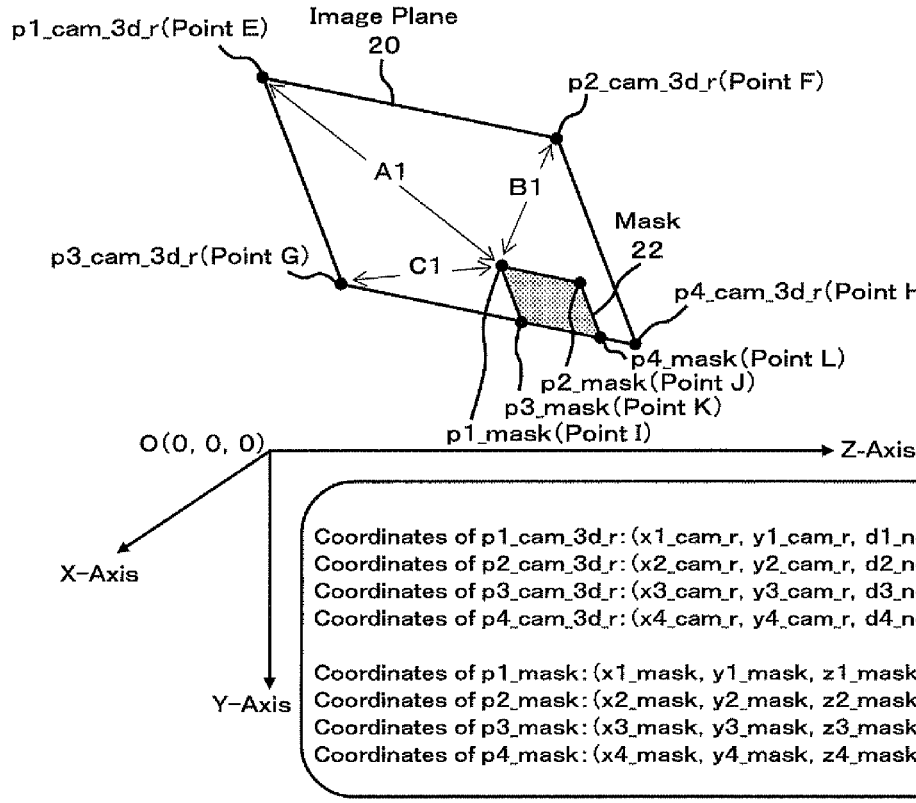
FIG. 11A is a view showing a relative position of a mask area on an image plane.
Figure 11B:
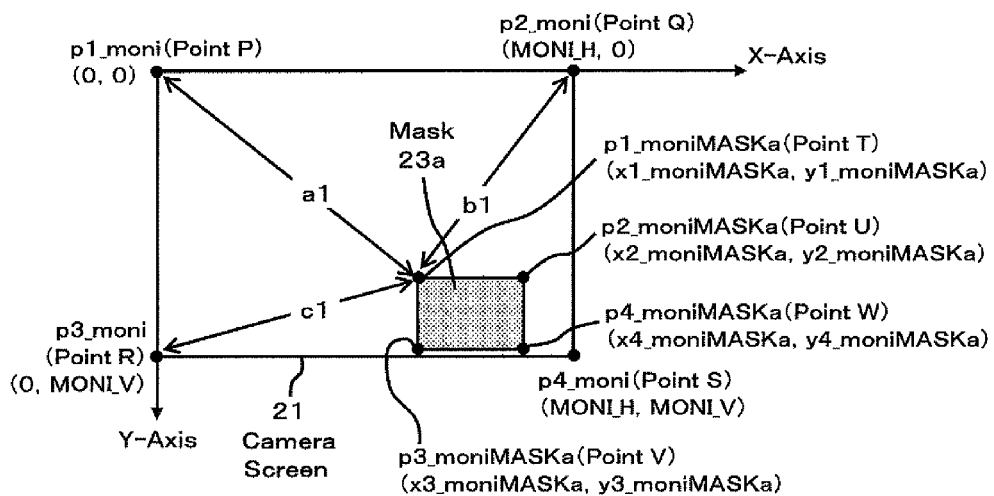
FIG. 11B is a view showing a relative position of another mask area on a camera screen.

FIG. 11 shows the relation between the corner coordinates (refer to FIG. 11A) of the mask 22 on the image plane 20 and the corner coordinates (refer to FIG. 11B) of the mask 23a on the camera screen 21. Each corner of the mask 22 is positioned on the image plane 20 in the 3-dimensional coordinate system, so it has only to be done that coordinates of points on the same plane in the 3-dimensional coordinate system are converted into those of points on the camera screen 21 in the 2-dimensional coordinate system. Now, the distances between points of the image plane 20 and each corner of the mask 22 in the 3-dimensional coordinate system as shown in FIG. 11A are calculated. For example, the distance between the corner E (p1_com_3d_r) of the image plane 20 and the corner I (p1_mask) of the mask 22 is calculated to be A1. Similarly, the distance between the corner F (p2_com_3d_r) of the image plane 20 and the corner I (p1_mask) of the mask 22 is calculated to be B1, and the distance between the corner G (p3_com_3d_r) of the image plane 20 and the corner I (p1_mask) of the mask 22 is calculated to be C1. Furthermore, the distances between corners E, F and G of the image plane 20 and the corner J (p2_mask) of the mask 22 are calculated to be A2, B2 and C2, respectively. The distances between corners E, F and G of the image plane 20 and the corner K (p3_mask) of the mask 22 are calculated to be A3, B3 and C3, respectively. The distances between corners E, F and G of the image plane 20 and the corner L (p4_mask) of the mask 22 are calculated to be A4, B4 and C4, respectively.

Similarly also in FIG. 11B, the distances between corners P, Q and R of the camera screen 21 and each of corners T, U, V and W (p1_moniMASKa, p2_moniMASKa, p3_moniMASKa, p4_moniMASKa) of the mask 23a in the 2-dimensional coordinate system are calculated to be a1, b1, c1, a2, b2, c2, a3, b3, c3, a4, b4 and c4, respectively.

In the concrete, the relation of the relative position of the mask 22 to the image plane 20 in the 3-dimensional coordinate system is similar to that of the mask 23a to the camera screen 21 in the 2-dimensional coordinate system. Therefore, the distances A1, B1, C1, and C4 are proportional to the distances a1, b1, c1, and c4 with a constant ratio, respectively. The corner coordinates of the mask 23a on the camera screen 21 can be calculated by using the constant ratio.

The processing load for the calculation is enlarged since the calculation of the square root is needed in case of the calculation of the distance between two points. So the square of a distance is used in an actual calculation. There is no problem also in case of using the square instead of the distance because of a comparison of the ratio The following equations (25) are formed concerning the relation of the distances A1, A2, and the distances a1, a2, . . . .

$$|\text{vector } FE|^2/A^{*2}=|\text{vector } QP|^2/a^{*2},$$

$$|\text{vector } FE|^2=\text{CAM\_}H^2,$$

$$|\text{vector } QP|^2=\text{MONI\_}H^2,$$

$$A^{*2}=(x^*\_\text{mask}-x1\_\text{cam}\_r)^2+(y^*\_\text{mask}-y1\_\text{cam}\_r)^2+(z^*\_\text{mask}-d1\_\text{now}\_r)^2 \text{ and}$$

$$a^{*2}=(x^*\_\text{moniMASK}a-0)^2+(y^*\_\text{moniMASK}a-0)^2 \quad \text{eq. (25)}$$

Here and hereinafter, "^2" means "square".

The following equations (26) are formed concerning the relation of the distances B1, B2, . . . and the distances b1, b2, . . . .

$$|\text{vector } FE|^2/B^{*2}=|\text{vector } QP|^2/b^{*2},$$

$$|\text{vector } FE|^2=\text{CAM\_}H^2,$$

$$|\text{vector } QP|^2=\text{MONI\_}H^2,$$

$$B^{*2}=(x^*\_\text{mask}-x2\_\text{cam}\_r)^2+(y^*\_\text{mask}-y2\_\text{cam}\_r)^2+(z^*\_\text{mask}-d2\_\text{now}\_r)^2 \text{ and}$$

$$b^{*2}=(x^*\_\text{moniMASK}a-\text{MINI\_}H)^2+(y^*\_\text{moniMASK}a-0)^2 \quad \text{eq. (26)}$$

The following equations (27) are formed concerning the relation of the distances A1, A2, . . . and the distances a1, a2, . . . .

$$|\text{vector } GE|^2/A^{*2}=|\text{vector } RP|^2/a^{*2},$$

$$|\text{vector } GE|^2=\text{CAM\_}V^2,$$

$$|\text{vector } RP|^2=\text{MONI\_}V^2,$$

$$A^{*2}=(x^*\_\text{mask}-x1\_\text{cam}\_r)^2+(y^*\_\text{mask}-y1\_\text{cam}\_r)^2+(z^*\_\text{mask}-d1\_\text{now}\_r)^2 \text{ and}$$

$$a^{*2}=(x^*\_\text{moniMASK}a-0)^2+(y^*\_\text{moniMASK}a-0)^2 \quad \text{eq. (27)}$$

The following equations (28) are formed concerning the relation of the distances C1, C2, . . . and the distances c1, c2, . . . .

$$|\text{vector } GE|^2/C^{*2}=|\text{vector } RP|^2/c^{*2},$$

$$|\text{vector } GE|^2=CAM\_V^2,$$

$$|\text{vector } RP|^2=MONI\_V^2,$$

$$C^{*2}=(x^*\_mask-x3\_cam\_r)^2+(y^*\_mask-y3\_cam\_r)^2+(z^*\_mask-d3\_now\_r)^2 \text{ and}$$

$$c^{*2}=(x^*\_moniMASKa-0)^2+(y^*\_moniMASKa-MONI\_V)^2 \quad \text{eq. (28)}$$

Solving the equations (25) and (26) for "x*_moniMASKa", and the equations (27) and (28) for "y*_moniMASKa", the following equations (29) and (30) are formed to calculate the corner coordinates of the mask 23a on the camera screen 21.

$$x^*\_moniMASKa=((MONI\_H\times(CAM\_H^2+A^{*2}-B^{*2}))/(2\times cAM\_H^2) \quad \text{eq. (29)}$$

$$y^*\_moniMASKa=((MONI\_V\times(CAM\_V^2+A^{*2}-C^{*2}))/(2\times CAM\_V^2) \quad \text{eq. (30)}$$

Thereby, the corner coordinates of the mask 22 on the image plane 20 in the 3-dimensional coordinate system can be converted into the corner coordinates of the mask 23a on the camera screen 21 in the 2-dimensional coordinate system without an operation for the reverse rotations. The privacy protection area can be covered with a mask displayed when the corner coordinates of the mask 23a on the camera screen 21 calculated by the mask display position calculating section 165 are set to the mask signal output section 108 in the image processing LSI 106.

Figure 12:
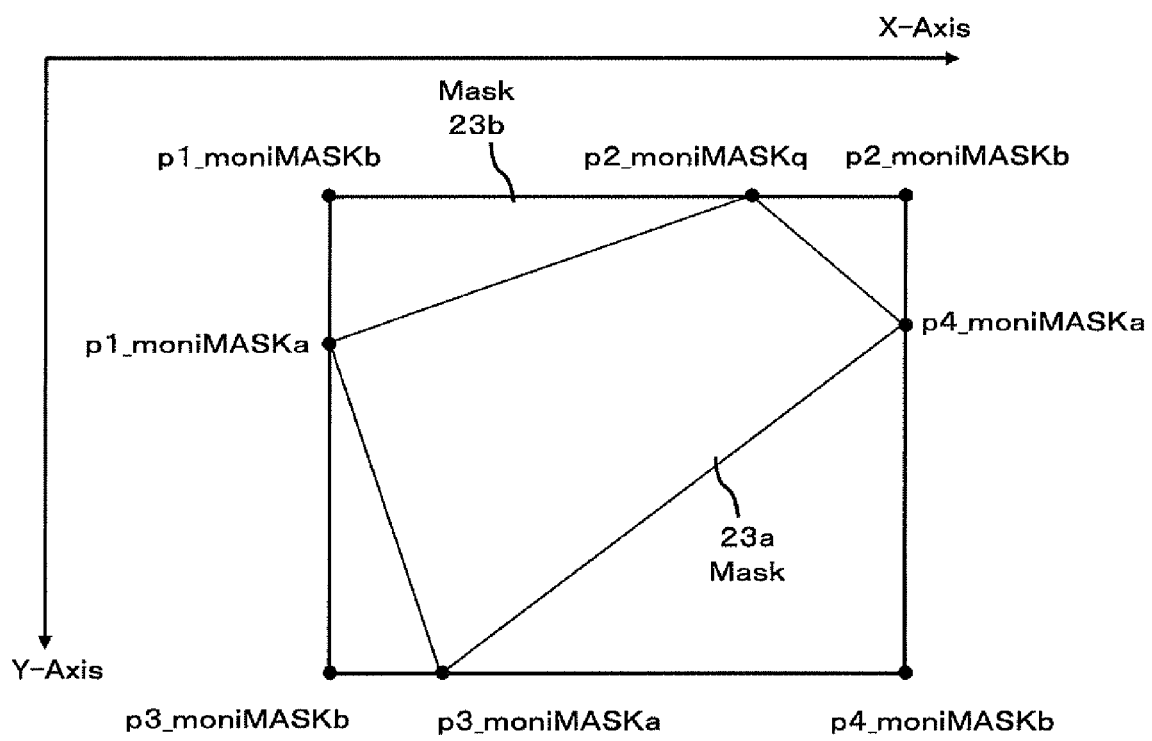
FIG. 12 is a view showing an example of a modification of a quadrilateral mask to a rectangular one on the camera screen.

However, the rectangular mask made by the mask making processing section 150 is changed to a complex contour like a trapezoid when it is rotated by PAN and/or TILT rotation angles. In case of such a complex contour, the processing load in the image processing LSI 106 is sometimes enlarged. Therefore, the mask coordinate modifying section 166 converts the corner coordinates of the mask 23a on the camera screen 21 calculated by the mask display position calculating section 165 into a simple rectangular mask before setting to the mask signal output section 108 in the image processing LSI 106. In the concrete, the mask coordinate modifying section 166 converts the mask 23a which is not yet processed for the conversion into a rectangular mask 23b which circumscribes the mask 23a as shown in FIG. 12.

When the converted corner coordinates of the mask 23b are expressed with p1_moniMASKb (x1_moniMASKb, y1_moniMASKb), p2_moniMASKb(x2_moniMASKb, y2_moniMASKb), p3_moniMASKb(x3_moniMASKb, y3_moniMASKb) and p4_moniMASKb(x4_moniMASKb, y4_moniMASKb), the corner coordinates of the mask 23b are expressed in the following equations (31) so that a rectangular mask can be always obtained.

$$x1\_moniMASKb=x3\_moniMASKb=\text{MIN}(x1\_moniMASKa,x2\_moniMASKa,x3moniMASKa,x4moniMASKa)$$

$$x2\_moniMASKb=x4\_moniMASKb=\text{MAX}(x1\_moniMASKa,x2\_moniMASKa,x3moniMASKa,x4moniMASKa)$$

$$y1\_moniMASKb=y2\_moniMASKb=\text{MIN}(y1\_moniMASKa,y2\_moniMASKa,y3moniMASKa,y4moniMASKa)$$

$$y3\_moniMASKb=y4\_moniMASKb=\text{MAX}(y1\_moniMASKa,y2\_moniMASKa,y3moniMASKa,y4moniMASKa) \quad \text{eq. (31)}$$

Where, MAX designates a function to select the maximum out of values in parentheses, and MIN designates a function to select the minimum out of values in parentheses.

From the foregoing description, a privacy protection area can always be covered with a rectangular mask having a simple contour by setting the corner coordinates of the mask 23b calculated to the mask signal output section 108 in the image processing LSI 106 even when the surveillance camera 21 is rotated so that a mask to cover a privacy protection area is deformed complicatedly. Furthermore, quantity of the operation can be largely reduced by transforming a mask 23a to be a rectangular mask 23b.

The result of a simulation for verifying enabling to carry out the control for masking a privacy protection area by using the equations (1) to (31) will be explained hereinafter. The sensor sizes of one pixel are set to be Pux=0.00000475 (m) and Puy=0.00000555 (m) as specifications of the imaging element 104. The horizontal pixel number and the vertical pixel number are Hpixel=768 pixels and Vpixel=494 pixels, respectively. The f value at a wide end for the lens 51 is set to be f value=0.0034 and d_base=256 as specifications thereof. In this case, the sizes CAM_H and CAM_V of the image plane 20 are calculated by the equations (5) and (6) to be formed as follows.

$$CAM\_H=(d\_base\times Pux\times H\text{pixel})/f\text{ value}=(256\times 0.00000475\times 768)/0.0034=274.67\approx 275 \quad \text{(from eq. (5))}$$

$$CAM\_V=(d\_base\times Puy\times V\text{pixel})/f\text{ value}=(256\times 0.00000555\times 494)/0.0034=206.43\approx 206 \quad \text{(from eq. (6))}$$

The sizes MONI_H and MONI_V of the camera screen 21 to display a picture thereon are set to be MONI_H=740 and MONI_V=480, respectively. And moniMASK_Hsize=16, moniMASK_Vsize=16, moniMASK_Hposi=64 and moniMASK_Vposi=64 are set for the mask 23 on the camera screen 21 through the camera operating device 3. The corner coordinates of the mask 23 on the camera screen 21 are calculated by the equations (11), (12), (13) and (14) to be formed as follows.

$$x1\_moniMASK=x3\_moniMASK=(MONI\_H/2)+(MONI\_H/256)\times(-moniMASK\_H\text{size}+moniMASK\_H\text{posi})=(740/2)+(740/256)\times(-16+64)=508.75\approx 509 \quad \text{(from eq. (11))}$$

$$x2\_moniMASK=x4\_monMASKi=(MONI\_H/2)+(MONI\_H/256)\times(moniMASK\_H\text{ size}+moniMASK\_H\text{posi})=(740/2)+(740/256)\times(16+64)=601.25\approx 601 \quad \text{(from eq. (12))}$$

$$y1\_moniMASK=y2\_moniMASK=(MONI\_V/2)-(MONI\_V/256)\times(moniMASK\_V\text{size}+moniMASK\_V\text{posi})=(480/2)-(480/256)\times(16+64)=90 \quad \text{(from eq. (13))}$$

$$y3\_moniMASK=y4\_moniMASK=(MONI\_V/2)-(MONI\_V/256)\times(-moniMASK\_V\text{size}+moniMASK\_V\text{posi})=(480/2)-(480/256)\times(-16+64)=150 \quad \text{(from eq. (14))}$$

Therefore, the corner coordinates of the mask 23 on the camera screen 21 are p1_moniMASK (509,90), p2_moniMASK (601,90), p3_moniMASK(509,150) and p4_moniMASK(601,150). And then, the corner coordinates of the mask 23 on the camera screen 21 are converted into coordinates on the image plane 20 so that the following equations are formed by using equations (15) and (16) as CAM_H=275 and CAM_V=206.

$$p1\_camMASK(x1\_camMASK, y1camMASK) = \\ p1\_moniMASK(509 \times 275/740 - 275/2, 90 \times 206/480 - 206/2) = (51.655, -64.375) \approx (52, -64)$$

$$p2\_camMASK(x2\_camMASK, y2\_camMASK) = \\ p2\_moniMASK(601 \times 275/740 - 275/2, 90 \times 206/480 - 206/2) = (85.844, -64.375) \approx (86, -64)$$

$$p3\_camMASK(x3\_camMASK, y3\_camMASK) = \\ p3\_moniMASK(509 \times 275/740 - 275/2, 150 \times 206/480 - 206/2) = (51.655, -38.625) \approx (52, -39)$$

$$p4\_camMASK(x4\_camMASK, y4\_camMASK) = \\ p4\_moniMASK(601 \times 275/740 - 275/2, 150 \times 206/480 - 206/2) = (85.844, -38.625) \approx (86, -39)$$

When a zoom position is at a wide end at the time of processing of making a mask, using d_set=256, the corner coordinates of the mask 22a on the image plane 20 in the 3-dimensional coordinate system in case that PAN rotation angle is zero and TILT rotation angle is zero are p1_camMASK_3d(52,−64,256), p2_camMASK_3d(86,−64,256), p3_camMASK_3d(52,−39,256) and p4_camMASK_3d(86,−39,256). And in case that PAN rotation angle θ at the present time is 32 degrees and TILT rotation angle γ at the present time is 45 degrees, the corner coordinates of the mask 22r in the 3-dimensional coordinate system rotated by θ=32 and γ=45 are found to be p1_camMASK_3d_r(116,−226,88), p2_camMASK_3d_r(145,−226,70), p3_camMASK_3d_r(125,−209,103) and p4_camMASK_3d_r(154,−209,85) by using equation (17). And the corner coordinates p1_camMASK_3d_r, p2_camMASK_3d_r, p3_camMASK_3d_r and p4_camMASK_3d_r are stored to the mask 3D position information 136 in the external memory 130 when the processing of making a mask is completed.

In the processing of displaying a mask, controlling for masking is done for the privacy protection area made in the processing of making a mask even when the surveillance camera 12 is rotated in PAN and/or TILT rotational directions and is zoomed so that an object for taking a picture and to be displayed on the camera screen 21 is changed. Now since MONI_H=740 and MONI_V=480, the corner coordinates of the camera screen 21 are found to be p1_moni(0,0), p2_moni(740,0), p3_moni(0,480) and p4_moni(740,480). These are converted into the coordinates of the image plane 20 by using equations like the equations (15) and (16) to be p1_cam(−137.5,−103), p2_cam(137.5,−103), p3_cam(−137.5,103) and p4_cam(137.5,103). So by setting d_now=256 at a wide end, the coordinates in the 3-dimensional coordinate system are found to be p1_cam_3d(−137.5,−103,256), p2_cam_3d(137.5,−103,256), p3_cam_3d(−137.5,103,256) and p4_cam_3d(137.5,103,256).

In case that PAN rotation angle and TILT rotation angle at the present time are set to be θ1=42 degrees and γ1=47 degrees, respectively and a zoom position is set to be at a wide end, the corner coordinates of the image plane 20 are calculated to be p1_cam_3d_r(−36,−257,166), p2_cam_3d_r(169,−257,−18), p3_cam_3d_r(65,−117,278) and p4_cam_3d_r(269,−117,94) by using equation (17). The vector product S×T is found to be (a, b, c)=(−25760,41544,−28700) by using equations (18), (19) and (20). In this case, the coefficients k1, k2, k3 and k4 are found to be as follows by using the mask 3D position information 136 and equation (24).

$$k1 = (a \times x1\_cam\_r + b \times y1\_cam\_r + c \times z1\_cam\_r)/ \\ (a \times x1\_camMASK\_r + b \times y1\_camMASK\_r + c \times d1\_set\_r) = (-25760 \times (-36) + 41544 \times (-257) - 28700 \times 166)/((-25760 \times 116 + 41544 \times (-226) - 28700 \times 88) \approx 0.974,$$

$$k2 = (a \times x1\_cam\_r + b \times y1\_cam\_r + c \times z1\_cam\_r)/(a \times x2\_camMASK\_r + b \times y2\_camMASK\_r + c \times d2\_set\_r) = (-25760 \times (-36) + 41544 \times (-257) - 28700 \times 166)/(-25760 \times 145 + 41544 \times (-226) - 28700 \times 70) \approx 0.959,$$

$$k3 = (a \times x1\_cam\_r + b \times y1\_cam\_r + c \times z1\_cam\_r)/ \\ (a \times x3\_camMASK\_r + b \times y3\_camMASK\_r + c \times d3\_set\_r) = (-25760 \times (-36) + 41544 \times (-257) - 28700 \times 166)/(-25760 \times 125 + 41544 \times (-209) - 28700 \times 103) \approx 0.977 \text{ and}$$

$$k4 = (a \times x1\_cam\_r + b \times y1\_cam\_r + c \times z1\_cam\_r)/ \\ (a \times x4\_camMASK\_r + b \times y4\_camMASK\_r + c \times d4\_set\_r) = (-25760 \times (-36) + 41544 \times (-257) - 28700 \times 166)/(-25760 \times 154 + 41544 \times (-209) - 28700 \times 88) \approx 0.962,$$

Therefore, the corner coordinates of the mask 22 projected on the image plane 20 are found to be as follows by using the above coefficients k1, k2, k3 and k4 and equation (21).

$$p1\_mask(x1\_mask, y1\_mask, z1\_mask) = 0.974 \times p1\_camMASK\_3d\_r(116, -226, 88) = (113, -220, 86),$$

$$p2\_mask(x2\_mask, y2\_mask, z2\_mask) = 0.959 \times p2\_camMASK\_3d\_r(145, -226, 70) = (139, -217, 67),$$

$$p3\_mask(x3\_mask, y3\_mask, z3\_mask) = 0.977 \times p3\_camMASK\_3d\_r(125, -209, 103) = (122, -204, 101), \text{ and}$$

$$p4\_mask(x4\_mask, y4\_mask, z4\_mask) = 0.962 \times p4\_camMASK\_3d\_r(154, -209, 85) = (148, -201, 82),$$

And then, the corner coordinates of the mask 22 projected onto the image plane 20 in the 3-dimensional coordinate system are converted into the corner coordinates of the mask 23a on the camera screen 21 in the 2-dimensional coordinate system by using equations (29) and (30). The calculation results are found to be as follows by using equation (29).

$$x1\_moniMASKa = ((MONI\_H \times (CAM\_H^2 + A1^2 - B1^2))/(2 \times CAM\_H^2) = ((740 \times (275^2 + 29970^2 - 15321^2))/(2 \times 275^2) = 441.6711,$$

$$x2\_moniMASKa = ((MONI\_H \times (CAM\_H^2 + A2^2 - B2^2))/(2 \times CAM\_H^2) = ((740 \times (275^2 + 42026^2 - 9725^2))/(2 \times 275^2) = 528.0346,$$

$$x3\_moniMASKa = ((MONI\_H \times (CAM\_H^2 + A3^2 - B3^2))/(2 \times CAM\_H^2) = ((740 \times (275^2 + 31998^2 - 19179^2))/(2 \times 275^2) = 432.7178 \text{ and}$$

$$x4\_moniMASKa = ((MONI\_H \times (CAM\_H^2 + A4^2 - B4^2))/(2 \times CAM\_H^2) = ((740 \times (275^2 + 44048^2 - 13577^2))/(2 \times 275^2) = 519.0813$$

The calculation results are found to be as follows also by using equation (30).

$$y1\_moniMASKa = ((MONI\_V \times (CAM\_V^2 + A1^2 - C1^2))/(2 \times CAM\_V^2) = ((480 \times (206^2 + 29970^2 - 49777^2))/(2 \times 206^2) = 127.98,$$

$$y2\_moniMASKa = ((MONI\_V \times (CAM\_V^2 + A2^2 - C2^2))/(2 \times CAM\_V^2) = ((480 \times (206^2 + 42026^2 - 9725^2))/(2 \times 206^2) = 138.3637,$$

$$y3\_moniMASKa = ((MONI\_V \times (CAM\_V^2 + A3^2 - C3^2))/(2 \times CAM\_V^2) = ((480 \times (206^2 + 31998^2 - 19179^2))/(2 \times 206^2) = 182.6016 \text{ and}$$

$$y4\_moniMASKa = ((MONI\_V \times (CAM\_V^2 + A4^2 - C4^2))/(2 \times CAM\_V^2) = ((480 \times (206^2 + 44048^2 - 13577^2))/(2 \times 206^2) = 192.9852$$

The contour defined by the above corner coordinates of the mask 23a on the camera screen 21 is not a rectangle, so it is converted into a rectangle by using equation (31) so that the corner coordinates of the mask 23b are found to be as follows.

$x1\_moniMASKb =$ $x3\_moniMASKb = \mathrm{MIN}(x1\_moniMASKa, x2\_moniMASKa,$ $x3moniMASKa, x4moniMASKa) =$ $\mathrm{MIN}(441.6711, 528.0346, 432.7178, 519.0813) = 432.7178,$ $x2\_moniMASKb = x4\_moniMASKb = \mathrm{MAX}(x1\_moniMASKa,$ $x2\_moniMASKa, x3moniMASKa, x4moniMASKa) =$ $\mathrm{MAX}(441.6711, 528.0346, 432.7178, 519.0813) = 528.0346,$ $y1\_moniMASKb = y3\_moniMASKb = \mathrm{MIN}(y1\_moniMASKa,$ $y2\_moniMASKa, y3moniMASKa, y4moniMASKa) =$ $\mathrm{MIN}(127.98, 138.3637, 182.6016, 192.9852) = 127.98 \text{ and}$ $y2\_moniMASKb = y4\_moniMASKb = \mathrm{MAX}(y1\_moniMASKa,$ $y2\_moniMASKa, y3moniMASKa, y4moniMASKa) =$ $\mathrm{MAX}(127.98, 138.3637, 182.6016, 192.9852) = 192.9852$ From the foregoing, it will be appreciated that the image device 10 in this embodiment can certainly carry out masking for the set privacy protection area even when the surveillance camera 12 is rotated in PAN and/or TILT rotational directions and zoomed, by setting the calculated corner coordinates of the mask 23b to the mask signal output section 108 in the image processing LSI 106 and carrying out masking. And the image device 10 can reduce the processing load by rotating the image plane 20 after it is positioned so as to be perpendicular to one axis (the Z-axis in this embodiment) of three axes in the 3-dimensional coordinate system in the state that PAN rotation angle is zero and TILT rotation angle is also zero. Furthermore, each corner position of the mask on the camera screen 21 in the 2-dimensional coordinate system is obtained as a point position on the camera screen 21 having distances apart from three corners of the camera screen 21 each of which distances is proportional to each of distances between the corner of the mask 22 on the image plane 20 and three corners of the image plane 20 with a similitude ratio by utilizing the similarity of the size of the image plane 20 and the size of the camera screen 21, when a position of the mask on the image plane 20 in the 3-dimensional coordinate system after PAN rotation, TILT rotation and a zooming is converted into a position on the camera screen 21 in the 2-dimensional coordinate system. Thanks to such structure of the image device 10 in this embodiment, it can accurately calculate the mask area to protect privacy on the camera screen 21 even if the mask area is deformed by PAN and/or TILT rotations and a zooming.

DESCRIPTION OF REFERENCE NUMERALS

| | |
|---|---|
| 1 | Surveillance camera system |
| 3 | Camera operating device |
| 4 | Display device |
| 5 | Lens unit |
| 10 | Image device |
| 12 | Surveillance camera |
| 20 | Image plane |

DESCRIPTION OF REFERENCE NUMERALS -continued

| | |
|---|---|
| 21 | Camera screen |
| 22, 22a, 22r | Mask (first mask area) |
| 23, 23a, 23b | Mask (second mask area) |
| 51 | Lens |
| 52 | Iris diaphragm |
| 104 | Imaging element |
| 105 | AFE (Analog Front End Circuit) |
| 106 | Image processing LSI |
| 107 | Signal processing section |
| 108 | Mask signal output section |
| 109 | DAC (Digital Analog Converter) |
| 110 | Camera image signal output section |
| 120 | Microcomputer |
| 121 | Motor Controlling Section |
| 122 | Control position information obtaining section |
| 123 | Privacy mask controlling section |
| 124 | Mask mode judgment section |
| 125 | SIN · COS calculating section |
| 130 | External memory |
| 131 | Screen information |
| 132 | Camera screen information |
| 133 | Image plane information |
| 134 | Z value table |
| 135 | Angle table |
| 136 | Mask 3D position information |
| 140 | Zoom lens controlling motor |
| 150 | Mask making processing section |
| 151 | Mask setting information obtaining section |
| 152 | Mask display position calculating section |
| 153 | Mask 2D 2D converting section |
| 154 | Mask 2D 3D converting section (Mask generating section) |
| 155 | Mask rotation processing section (Mask generating section) |
| 160 | Mask display processing section |
| 161 | Camera screen 2D 2D converting section |
| 162 | Image plane 2D 3D converting section |
| 163 | Image plane rotation processing section |
| 164 | Mask projected position calculating section (Mask generating section) |
| 165 | Mask display position calculating section |
| 166 | Mask coordinate modifying section |

What is claimed is:

1. An image device including an imaging element which image device is mountable to a rotative table and for masking a partial area of a picture to be displayed on a camera screen so as not to be seen which picture has been captured by the imaging element, comprising:

a control position information obtaining section configured to obtain PAN and TILT rotation angles of said rotative table and a zoom position;

a mask generating section configured to calculate coordinates of corners of a first mask area disposed on an image plane defined by said imaging element, the coordinates being in a 3-dimensional coordinate system having an origin through which a central axis of a rotation for the PAN rotation angle and another central axis of a rotation for the TILT rotation angle pass;

a mask display position calculating section configured to calculate coordinates of corners of a second mask area on said camera screen in a 2-dimensional coordinate system from said coordinates of the corners of said first mask area calculated by said mask generating section by using a relation that distances between a plurality of corners of said camera screen and each corner of said second mask area are proportional to distances between a plurality of corners of said image plane and each corner of said first mask area with a constant ratio, respectively; and a mask signal output section configured to be able to add a masking signal to a signal of the picture to be displayed on said camera screen so that the picture in said second mask area is not able to be seen.

2. An image device as claimed in claim 1, wherein said mask generating section comprises:
a mask 2D 3D converting section configured to calculate a first information of coordinates of the corners of said first mask area on said image plane positioned in the state that one coordinate axis of three coordinate axes in said 3-dimensional coordinate system passes through a center of and perpendicular to said image plane and when said zoom position is a preset position said image plane is positioned at a position with a coordinate value on said one coordinate axis which coordinate value is corresponding to said preset position;
a mask rotation processing section configured to calculate and store a second information to a memory section which second information is coordinates of the corners of said first mask area which coordinates are calculated by converting said first information into said second information for rotations based on PAN and TILT rotation angles of said imaging element as a result of a PAN rotation and a TILT rotation; and
a mask projected position calculating section configured to calculate coordinates of the corners of said first mask area which coordinates are those of intersections at each of which intersections each straight line connecting said origin and each corner of said first mask area with said second information derived from said memory section, and said image plane at a present time after a zooming and PAN and TILT rotations, intersect.

3. An image device as claimed in claim 1, further comprising a mask coordinate modifying section configured to convert said second mask area into a rectangular area having two sides each of which is parallel with each coordinate axis in said 2-dimensional coordinate system of said camera screen and circumscribes a contour of said second mask area in case that said contour is not a rectangle having a side parallel with a coordinate axis in said 2-dimensional coordinate system.

4. A surveillance camera having a camera including an optical lens unit, an imaging element and an image processing section for processing a signal of a picture captured by said imaging element and outputting a processed signal of the picture to a camera screen, and a rotative table supporting the camera rotatively, comprising:
a control position information obtaining section configured to obtain PAN and TILT rotation angles of said rotative table and a zoom position;
a mask generating section configured to calculate coordinates of corners of a first mask area disposed on an image plane defined by said imaging element, the coordinates being in a 3-dimensional coordinate system having an origin through which a central axis of a rotation for the PAN rotation angle and another central axis of a rotation for the TILT rotation angle pass;
a mask display position calculating section configured to calculate coordinates of corners of a second mask area on said camera screen in a 2-dimensional coordinate system from said coordinates of the corners of said first mask area calculated by said mask generating section by using a relation that distances between a plurality of corners of said camera screen and each corner of said second mask area are proportional to distances between a plurality of corners of said image plane and each corner of said first mask area with a constant ratio, respectively; and a mask signal output section configured to be able to add a masking signal to a signal of the picture to be displayed on said camera screen so that the picture in said second mask area is not able to be seen,
whereby masking can be carried out in a partial area of the picture to be displayed on said camera screen.

5. A surveillance camera as claimed in claim 4, wherein said mask generating section comprises:
a mask 2D 3D converting section configured to calculate a first information of coordinates of the corners of said first mask area on said image plane positioned in the state that one coordinate axis of three coordinate axes in said 3-dimensional coordinate system passes through a center of and perpendicular to said image plane and when said zoom position is a preset position said image plane is positioned at a position with a coordinate value on said one coordinate axis which coordinate value is corresponding to said preset position;
a mask rotation processing section configured to calculate and store a second information in a memory section which second information is coordinates of the corners of said first mask area which coordinates are calculated by converting said first information into said second information for rotations based on PAN and TILT rotation angles of said imaging element as a result of a PAN rotation and a TILT rotation; and
a mask projected position calculating section configured to calculate coordinates of the corners of said first mask area which coordinates are those of intersections at each of which intersections each straight line connecting said origin and each corner of said first mask area with said second information derived from said memory section, and said image plane at a present time after a zooming and PAN and TILT rotations, intersect.

6. A surveillance camera as claimed in claim 4, further comprising a mask coordinate modifying section configured to convert said second mask area into a rectangular area having two sides each of which is parallel with each coordinate axis of said 2-dimensional coordinate system of said camera screen and circumscribes a contour of said second mask area in case that said contour is not a rectangle having a side parallel with a coordinate axis of said 2-dimensional coordinate system.

7. A mask method of masking a camera screen by using an image device including an imaging element which image device is mountable to a rotative table and for masking a partial area of a picture to be displayed on the camera screen so as not to be seen which picture has been captured by the imaging element, comprising:
a first step of obtaining PAN and TILT rotation angles of said rotative table and a zoom position;
a second step of calculating coordinates of corners of a first mask area on an image plane defined by said imaging element which coordinates is in a 3-dimensional coordinate system having an origin through which a central axis of a rotation for the PAN rotation angle and another central axis of a rotation for the TILT rotation angle pass;
a third step of calculating coordinates of corners of a second mask area on said camera screen in a 2-dimensional coordinate system from said coordinates of the corners of said first mask area calculated by said second step by using a relation that distances between a plurality of corners of said camera screen and each corner of said second mask area are proportional to distances between a plurality of corners of said image plane and each corner of said first mask area with a constant ratio, respectively; and a fourth step of adding a mask signal to a signal of the picture to be displayed on said camera screen so that the picture in said second mask area calculated by said third step is not able to be seen.

8. A mask method of masking a camera screen as claimed in claim 7, wherein said second step comprises:
- a step of calculating a first information of coordinates of the corners of said first mask area on said image plane positioned in the state that one coordinate axis of three coordinate axes in said 3-dimensional coordinate system passes through a center of and perpendicular to said image plane and when said zoom position is a preset position said image plane is positioned at a position with a coordinate value on said one coordinate axis which coordinate value is corresponding to said preset position;
- a step of calculating and storing a second information to a memory section which second information is coordinates of the corners of said first mask area which coordinates are calculated by converting said first information into said second information for rotations based on PAN and TILT rotation angles of said imaging element as a result of a PAN rotation and a TILT rotation; and
- a step of calculating coordinates of the corners of said first mask area which coordinates are those of intersections at each of which intersections each straight line connecting said origin and each corner of said first mask area with said second information derived from said memory section, and said image plane at a present time after a zooming and PAN and TILT rotations, intersect.

9. A mask method of masking a camera screen as claimed in claim 7, further comprising the following step between said third and fourth steps, which following step is of converting said second mask area calculated by said third step into a rectangular area having two sides each of which is parallel with each coordinate axis in said 2-dimensional coordinate system of said camera screen and circumscribes a contour of said second mask area in case that said contour is not a rectangle having a side parallel with a coordinate axis in said 2-dimensional coordinate system.

* * * * *